United States Patent
Shipman

(10) Patent No.: US 7,873,639 B2
(45) Date of Patent: Jan. 18, 2011

(54) METHOD AND SYSTEM FOR PROCESSING OR SEARCHING USER RECORDS

(75) Inventor: Robert A Shipman, Sheffield (GB)

(73) Assignee: British Telecommunications public limited company, London (GB)

( * ) Notice: Subject to any disclaimer, the term of this patent is extended or adjusted under 35 U.S.C. 154(b) by 148 days.

(21) Appl. No.: 10/532,106

(22) PCT Filed: Oct. 21, 2003

(86) PCT No.: PCT/GB03/04519

§ 371 (c)(1),
(2), (4) Date: Apr. 21, 2005

(87) PCT Pub. No.: WO2004/038622

PCT Pub. Date: May 6, 2004

(65) Prior Publication Data

US 2006/0080283 A1    Apr. 13, 2006

(30) Foreign Application Priority Data

Oct. 22, 2002 (GB) .................................. 0224589.2

(51) Int. Cl.
*G06F 17/30* (2006.01)
(52) U.S. Cl. ................. 707/737; 707/610; 707/706; 707/713; 707/722; 707/741; 707/752; 707/770; 707/791; 707/802; 707/828; 709/201; 709/203; 379/88.19; 379/88.2; 379/189; 379/188
(58) Field of Classification Search .............. 707/2, 707/102, 610, 706, 713, 722, 737, 741, 752, 707/770, 791, 802, 828, 999.003, 999.01, 707/999.101, 999.103, 999.107; 709/201, 709/203; 379/88.19, 88.2, 88.21, 189, 188
See application file for complete search history.

(56) References Cited

U.S. PATENT DOCUMENTS

| | | | | |
|---|---|---|---|---|
| 5,844,973 A | * | 12/1998 | Venkatraman et al. | . 379/127.05 |
| 5,956,717 A | * | 9/1999 | Kraay et al. | ................. 707/10 |
| 6,026,390 A | * | 2/2000 | Ross et al. | ..................... 707/2 |
| 6,094,654 A | * | 7/2000 | Van Huben et al. | ............ 707/8 |
| 6,105,026 A | * | 8/2000 | Kruglikov et al. | .............. 707/8 |

(Continued)

FOREIGN PATENT DOCUMENTS

WO    WO 95/22111    8/1995

(Continued)

*Primary Examiner*—Syling Yen
(74) *Attorney, Agent, or Firm*—Nixon & Vanderhye P.C.

(57) ABSTRACT

Preferably for use in a directory enquires system, a method and system are provided for processing user records to determine common entries between them. When two user records are determined to store common information then link data is generated and stored in each user record indicating a link between the two records. This link information is then used in subsequent searching of the user records to determine the most likely result from a list of possible results obtained from a search of the user records. In a directory enquiries system the user records contain user ID and telephone number details as well as address book data of each user's friends, family, or other acquaintances. The address book data is used to determine whether a link between user records should be formed.

8 Claims, 12 Drawing Sheets

U.S. PATENT DOCUMENTS 6,223,182 B1 * 4/2001 Agarwal et al. ............. 707/102
6,269,369 B1 * 7/2001 Robertson .................... 707/10
6,292,830 B1 * 9/2001 Taylor et al. ................ 709/224
6,324,541 B1 * 11/2001 de l'Etraz et al. ........ 707/104.1
6,950,504 B1 * 9/2005 Marx et al. ............. 379/88.19
2003/0101286 A1 * 5/2003 Kolluri et al. ............... 709/316

FOREIGN PATENT DOCUMENTS

WO    WO 98/24031    6/1998
WO    WO 01/95600    12/2001

* cited by examiner

METHOD AND SYSTEM FOR PROCESSING OR SEARCHING USER RECORDS

This application is the US national phase of international application PCT/GB2003/004519 filed 21 Oct. 2003 which designated the U.S. and claims benefit of GB 0224589.2, dated 22 Oct. 2002, the entire content of which is hereby incorporated by reference.

TECHNICAL FIELD

The present invention relates to a method and a system for processing user records to determine links therebetween, and a method and a system which uses the link information for searching of the user records.

BACKGROUND TO THE PRESENT INVENTION AND PRIOR ART

Directory enquiry (DQ) services for wireline telephones have been available for some years. The usual interface to such a service is to telephone a directory enquiries operator, and provide a name of a person for which the corresponding telephone number is desired. Directory enquiries is an established and profitable service for land lines in the UK, and the service has proved relatively easy to deploy for a number of reasons, as outlined below.

Firstly, at least within the UK there is a dominant operator, and hence the majority of numbers are accessible from a single source. This means that the "critical mass" of available numbers required for a successful DQ service is easily achieved.

Secondly the phones are tied to a location. Thus, phone numbers can be easily categorised according to address and duplicate names can be disambiguated. Where multiple name matches are obtained the DQ operator can ask for additional information such as geographical information to differentiate the multiple matches.

Thirdly, the details of the telephone line's owner are always known, as it is necessary to provide identification details and an address at which the telephone line is to be installed.

In contrast to the DQ situation for wireline telephone lines the corresponding provision of DQ services for mobile telephones is much less straightforward, as there are a number of complicating factors, as outlined next.

Firstly in many countries there is no dominant operator, and hence it is difficult to create the "critical mass" of registered users necessary to provide a comprehensive DQ service. In the UK for example customers are relatively evenly split between 4 main operators and a comprehensive directory necessitates agreement between these operators.

Secondly, by their nature mobile telephones are not tied to a particular address and thus categorisation by address is less appropriate. This leads to problems in resolving duplicate names, as geographical information cannot then be used to differentiate between multiple results.

Thirdly a further problem arises due to the ability of mobile telephone users to have "Pre-pay" or "Pay-as-you-go" price plans. For example the majority of mobile telephones purchased in the UK are pre-pay telephones and are typically purchased anonymously. In many cases it is therefore not possible for the network operators to know the identities of the majority of their customers. Without such identity information it becomes very difficult to compile a comprehensive enough directory of names and numbers to allow a DQ service to be offered.

The absence of a centralised DQ service for mobile telephones is presently alleviated somewhat by the provision of name and number memory stores on the mobile telephone handsets themselves, commonly known as "Address Books". Here a mobile telephone user can store the names and associated mobile and/or fixed-line telephone numbers of all of his family, friends and other acquaintances. In use the user can select the number for a particular person direct from the telephone address book for dialing by the telephone.

The mere provision of mobile telephone address books in itself provides additional problems, however, as if a mobile telephone is lost or stolen then all the numbers stored within the address book will at worst need to be gathered again, or at best need to be entered into a new mobile telephone. Moreover, it is quite common for mobile telephone users to change their telephones on a regular basis, and frequently this is most economically achieved by taking a new connection with a new number. This necessitates a user having to communicate her new number to those people who she wishes to have it, and those people updating their telephone address books. Similarly, due to this "number churn" the numbers stored in any particular user's mobile telephone address book may not be current as other users may have changed their telephones without notifying the user.

In unrelated art, in the 1960's Stanley Milgram in "The Small World Problem", *Psychology Today* 1(1):60-76 showed that any two randomly chosen individuals in the United States are linked by a chain of six or fewer first-name acquaintances. This concept has been popularised generally as the well known "six degrees of separation" concept, or "small-world" theory. The concept has been applied in the past to the problem of expert referrals, and Kautz H et al. in "The Hidden Web", Al Magazine, Summer 1997, American Association of Al, pp. 27-36 describe an expert referral system applied to the field of Al experts.

SUMMARY OF THE INVENTION

In view of the above problems in the field of DQ services, and the known concept and applications of small-world theory, the present invention builds upon the realisation that the address book data stored in user's mobile telephones can itself be exploited in accordance with Milgram's small world theory to alleviate the problems outlined above and to allow a workable directory enquiry service to be provided for mobile telephones. In particular the inventor has realised that the address book data stored in a mobile telephone address book is representative of the telephone's user's social ties within society, and can be used to determine the user's so-called "geographical position" within society, based on the social links as evidenced by an entry in his mobile telephones address book. This notion is then further combined with the further realisation that it is highly likely that for any particular user who wishes to look up a number in a DQ service that at least one of his family, friends, or acquaintances may know the number in advance. This application of "mall-world" theory can then be used to prioritise numbers returned from a DQ search in a similar manner to that in which geographical information is used in a conventional land-line DQ service. However, instead of a registered user's geographical position on the Earth being determinative, it is instead the user's "geographical" position in the web of social ties as defined by the mutual entries in users' address books which is used to disambiguate. Moreover, this concept is not limited to application to mobile telephone numbers, but may find application in any system wherein user addresses such as email addresses, IP addresses, or even physical addresses are subject to change.

In order to facilitate and realise the above described concept, the invention provides two main aspects. Firstly, the invention provides a mechanism for analysing user address book records and determining common entries therebetween which are indicative of social ties between users. The mechanism results in the provision of link information representative of the social ties, and which can then be used in subsequent searching of the user address book records. Therefore, secondly the invention further provides a mechanism for searching of the user records in response to a query, and using the link information to determine the most relevant result.

In view of the above, from a first aspect the present invention provides a method for processing user records, comprising the steps of:

a) receiving user record information from a plurality of users, each set of user record information including at least a user identifier and/or a user address, and at least a subset of the received sets of user record information each further including a list of one or more other user identifiers and user addresses b) storing the received sets of user record information as a plurality of user records;

c) processing the user records to determine any common user identifiers and/or user addresses stored therein; and d) storing link information linking those user records for which common user identifiers and/or user addresses were found to be stored therein.

Thus the first aspect of the invention provides the advantage that user records, some of which may include lists of user identifiers and user addresses, can be processed such that common user identifiers or user addresses therebetween are identified. This allows the social ties represented by, for example, common entries in mobile telephone address books to be identified. Link information may then be generated and stored which is representative of these identified social ties, and which can be used in a record searching process to refine the search results.

Preferably, at least one or more of the user addresses are telephone numbers, and at least some of these telephone numbers are preferably mobile telephone numbers. Thus the method according to the first aspect is particularly suitable for processing user records comprising lists of names and associated telephone numbers. The ability to process such information is useful in the provision of a directory enquiry service.

In alternative embodiments, the user addresses may be email addresses, network addresses, or physical addresses.

In a preferred embodiment, the processing step further comprises:

processing the user records to determine, for any particular user record, whether the user address and/or user identifier thereof is/are included in any of the list of user identifiers and/or user addresses from the other user records;

and wherein the storing step further comprises:

storing link information linking the particular user record with those other of the user records whose lists include the particular user record's user address and/or user identifier.

The above arrangement provides the advantage that a particular user record's user address or user identifier may be searched for in other user record's list of user identifiers or user addresses, so as to determine a link between the user records. In the context of mobile telephone numbers, this allows for a user's mobile telephone number or name to be searched for in other users address books, and a link established on the basis thereof. Such searching allows social ties represented by the address book entries to be identified.

Moreover, in the preferred embodiment the processing step preferably further comprises processing the user records to determine, for any particular user identifier and/or user address stored in the list of any particular user record, whether the user address and/or user identifier is/are the same as any of the other user record user identifiers and/or user addresses; and the storing step preferably further comprises: storing link information linking the particular user record to those other of the user records whose user identifiers and/or user addresses are the same as the particular user identifier and/or user address stored in the list of the particular user record.

The above arrangement allows for a user identifier and/or user address stored in a particular user records a list to be matched with any of the other user identifiers and/or user addresses from the other users records. In the context of a mobile telephone address book, this allows an entry in an address book to be matched with the name and/or telephone number of a user registered for the directory enquiry service, and thereby establish a link therebetween.

By establishing such link information, the results returned from a search from a set of user records can use the link information to refine the results thereof, and hence improve the accuracy of the search.

From a second aspect, the present invention provides a method for searching user records for user addresses in response to a request therefor, comprising the steps:

a) storing a plurality of user records, each record to be processed including at least a user identifier and/or a user address, and at least a subset of the user records each further including a list of one or more other user identifiers and user addresses;

b) storing link information linking those user records for which common user identifiers and/or user addresses are stored therein;

c) receiving a search request from a user specifying a user identifier for which the corresponding user address is required; and d) searching the stored user records using the link information to provide one or more user addresses from the user records corresponding to the user identifier specified in the search request.

In the second aspect the advantage is provided that a more targeted list of search results in obtained by virtue of the link information being used to provide the search results, and hence thereby refine such results.

In a preferred embodiment the searching step further comprises identifying the user record of the user making the search request, and using the link information to identify further user records linked to the identified user record; wherein the link information is iteratively used to identify further user records located up to a predetermined number of links from the user record of the user making the search request; the searching step further comprising:

comparing the user identifiers of each respective identified user record with the user identifier specified in the search request; and returning the user addresses of those user records whose user identifiers matched the search request as the search results.

Furthermore, in an embodiment the searching step d) further comprises the steps of:

e) searching the user records to produce a list of search results corresponding to the search request; and f) using the link information to order the list of search results in order of potential relevance.

For example, the link information may be used to order the list of search results by "distance" in terms of the number of links or "hops" from each user record where the results were found, to the user record of the user who requested the search. Thus far more targeted search results can be obtained than would otherwise be the case.

Furthermore, preferably within the second aspect at least one or more of the user addresses are telephone numbers, and even more preferably at least some of the telephone numbers are mobile telephone numbers. Moreover, preferably at least one or more of the user identifiers are the names of registered users. Such features allow the method according to the second aspect of the invention to be particularly adapted for use in a directory enquiries service.

In addition, from a third aspect there is also provided a system for processing user records, comprising:

a) means for receiving user record information from a plurality of users, each set of user record information including at least a user identifier and/or a user address, and at least a subset of the received sets of user record information each further including a list of one or more other user identifiers and user addresses b) record storage means for storing the received sets of user record information as a plurality of user records; and c) record processing means for processing the user records to determine any common user identifiers and/or user addresses stored therein;

wherein the record storage means is further arranged to store link information linking those user records for which common user identifiers and/or user addresses were found to be stored therein, as determined by the record processing means.

Within the third aspect the corresponding further features and advantages as previously described in respect of the first aspect may be obtained.

Moreover, from a fourth aspect the invention further provides a system for searching user records for user addresses in response to a request therefor, comprising:

a) storage means, arranged to store:
  i) a plurality of user records, each record to be processed including at least a user identifier and/or a user address, and at least a subset of the user records each further including a list of one or more other user identifiers and user addresses; and
  ii) link information linking those user records for which common user identifiers and/or user addresses are stored therein;

c) means for receiving a search request from a user specifying a user identifier for which the corresponding user address is required; and d) search means arranged to search the stored user records using the link information to provide one or more user addresses from the user records corresponding to the user identifier specified in the search request.

Within the fourth aspect the corresponding further features and advantages as previously described in respect of the second aspect may further be obtained.

Additionally, from a fifth aspect the present invention also provides a computer program arranged such that when executed on a computer system it causes the computer system to perform the method of any of the aforementioned second or first aspects. Moreover, from a sixth aspect there is also provided a computer readable storage medium storing at least part of a computer program according to the fifth aspect. In the sixth aspect the computer readable storage medium may be any magnetic, optical, magneto-optical, solid state, volatile, non-volatile, or any other suitable computer program storage medium known in the art.

DESCRIPTION OF THE DRAWINGS

Further features and advantages of the present invention will become apparent from the following description of embodiments thereof, presented by way of example only, and by reference to the accompanying drawings, wherein like reference numerals refer to like parts, and wherein:

FIG. 11 is a graphical presentation of a plurality of user records, and illustrating the links formed there between.

DESCRIPTION OF THE EMBODIMENTS

Two embodiments of the present invention will now be described. Both of the embodiments share the same system architecture and also several program components, and differ only in the search algorithms employed thereby. There thus follows a common description of the system architecture of the two embodiments, as well as of the user record format, and link creation programs thereof, followed by separate descriptions of the two different search algorithms. Finally, an example operation of the embodiments of the present invention when in use will be described. In respect to all of the above, it should be noted that the description of the embodiments of the invention is given in the context of the provision of a directories enquiry service, wherein users are registered for the directory enquiry service and thereby have their numbers available to other users through such service.

Figure 1:
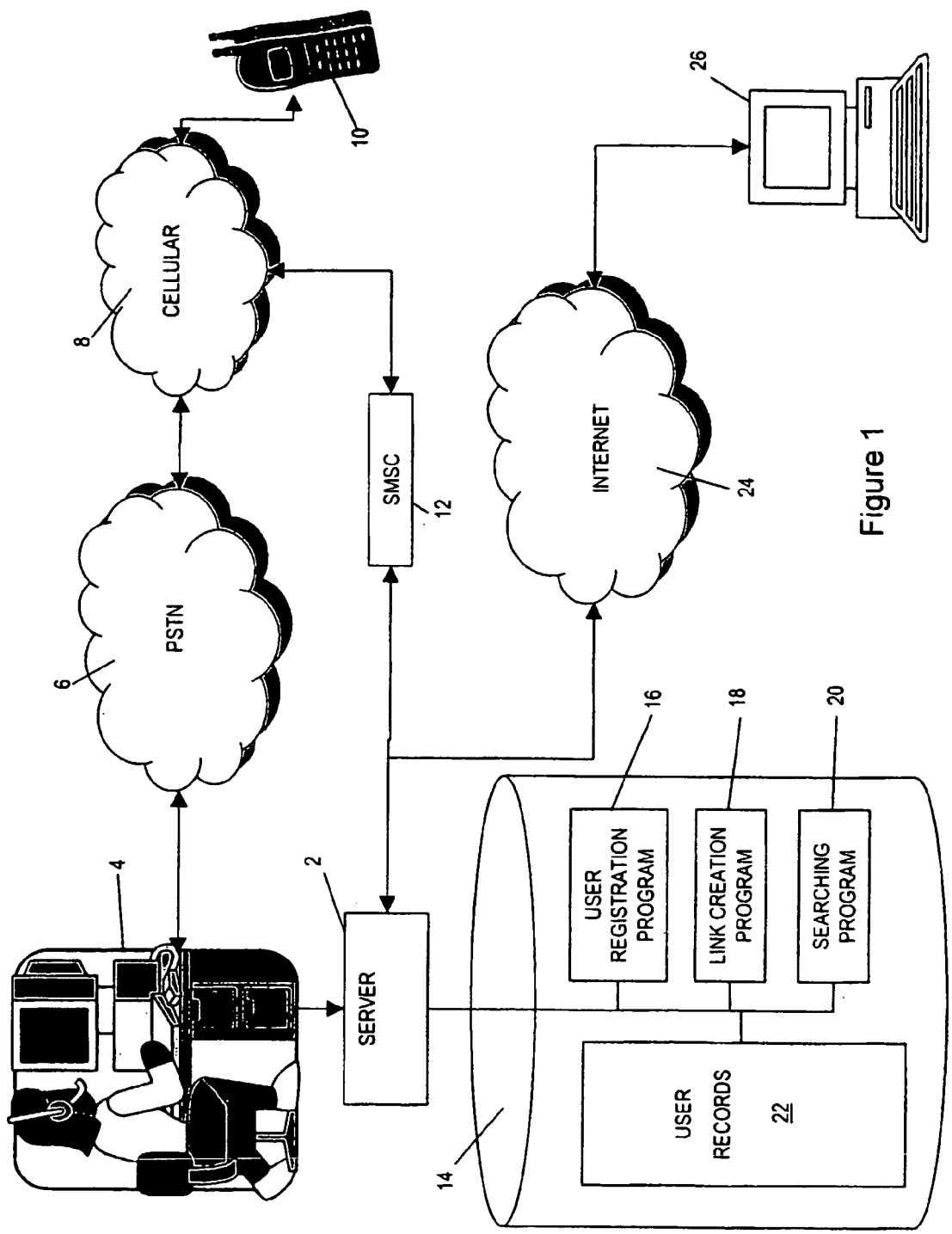
FIG. 1 is an overall system architecture block diagram illustrating the various components of the embodiments of the present invention.

Turning first to FIG. 1, FIG. 1 illustrates an overall system architecture of a directory enquiries (DQ) service as provided by the embodiments of the present invention. Here, a directory enquiries server computer 2 is provided, which has provided therein or otherwise accessible thereby a storage medium 14 which has a plurality of user records 22 stored therein, as well computer control programs 16, 18, and 20 which control the operation of the DQ server 2. More particularly, a user registration program 16 is provided which controls the server during the registration of users to the service; a link creation program 18 is provided which controls the server to create links between individual user records; and a searching program 20 is provided, which controls the server to search the user records 22.

A plurality of user interfaces are provided into the server 2. Firstly, a directory enquiry call centre 4 may be provided, staffed with human operators provided with terminals arranged to communicate with the DQ server 2. Each human operator is further provided with a telephone line hooked up to the public switched telephone network (PSTN) 6. Accessible via the PSTN 6 are one or more cellular mobile telephone networks 8 which provide access infrastructure for a plurality of mobile telephone handsets 10. Thus, the user of a mobile telephone handset may make a telephone call to a DQ operator in the call centre 4 via the cellular networks 8, and the PSTN 6.

On receipt of such a call, the DQ call centre operator uses his terminal to enter a query which is passed by his terminal to the DQ server 2. The DQ server 2 may then use whichever of the controlling programs is appropriate for the particular query, to search, or otherwise operate on the user records 22. The result is then communicated back to the call centre operator via his terminal, who speaks the result to the user via the connection established over the cellular network 8, and the PSTN 6.

It should be noted, that in addition to making directory enquiry queries via the above described route, it is also possible for a user to both register for the directory enquiries service, and to enter his personal details, as well as the details stored in his mobile telephone address book into the user records 22. Here, the call centre operator simply enters the information into his terminal, which communicates the information to the server 2 which stores the information in the user records 22, as a new user record for the particular user. Further details of the individual user records are given later.

In addition to accessing the server 2 via a call centre, a user of the mobile telephone handset 10 may also directly access the server 2 by the sending of a short message service (SMS) message via the cellular network 8 to a short message switching centre 12 (SMSC). The short message switching centre 12 transmits the received SMS message from the cellular network 8 to the server 2. The server 2 is provided with software to parse the received SMS message to thereby understand the users query. The query can then be acted upon by the server by the appropriate selection and execution of the necessary control program 16, 18, or 20, and the results passed back to the mobile handset 10 in the form of a reply SMS sent via the SMSC 12 and the cellular network 8.

It is envisaged that the same operations should be performed via the SMS route to the server 2 as are possible via the call centre 4. That is, the user may register for the DQ service via SMS, as well as make data entries of his own name and telephone number as well as of those stored in his address book, and may also send DQ search queries to the searcher via SMS. In order to permit such functionality, the server 2 is provided with an SMS parser program (not shown) which allows the SMS messages received from the user 10 to be understood. Preferably, the commands available to the user to be sent via SMS to the server are predetermined in advance, such that the SMS parser program can be extremely simple in its functionality.

As a third interface to the server 2, the DQ server is also provided with a web server program (not shown), provided with web pages suitable for display by a common browser application. In order to facilitate transmission of such pages, the DQ server is further provided with an internet interface, to connect the server 2 to the internet 24. Such a connection allows any other internet user 26 to access the web pages available on the DQ server 2. As with the voice and SMS interfaces, the web interface preferably provides functionality to allow a user 26 to register for the directory enquiries service and also to allow the user to enter data such as his own personal data, and any address book entries which he may wish to enter onto the system. Moreover, the web pages preferably also provide a search interface to the server 2. The ability to enter user information onto web pages for transmission to a web server is well known in the art.

Whichever of the above described interfaces is used to access the server 2, it should be understood that the back-end processes performed by the server 2 to register new users, enter new data, or to perform directory searches are all identical, and are governed by the programs 16, 18, and 20, and the user records 22. Further details of the operation of these programs, and of the format of the user records 22 are given later.

Another interface channel not shown on the diagram may be provided by the provision of specialised terminals in central locations such as shops or the like. The terminal is adapted to interface with a user's mobile phone to read the address book entries on the mobile SIM card directly. The data from these address book entries may then be sent from the terminal to the server via a suitable network such as the internet. This has the advantage that the user need not use the cellular interface to send the data to the server, with the attendant costs in SMS charges. Such an interface channel would preferably be limited to allowing the registration of new users and the entering of address book data.

Having described the overall system architecture of the embodiments, further description will now be given of the apparatus required to form the server 2, followed subsequently by a description of the format of the user records 22, and of the operation of the user registration program 16, link creation program 18, and the searching program 20 for each of the embodiments.

Figure 2:
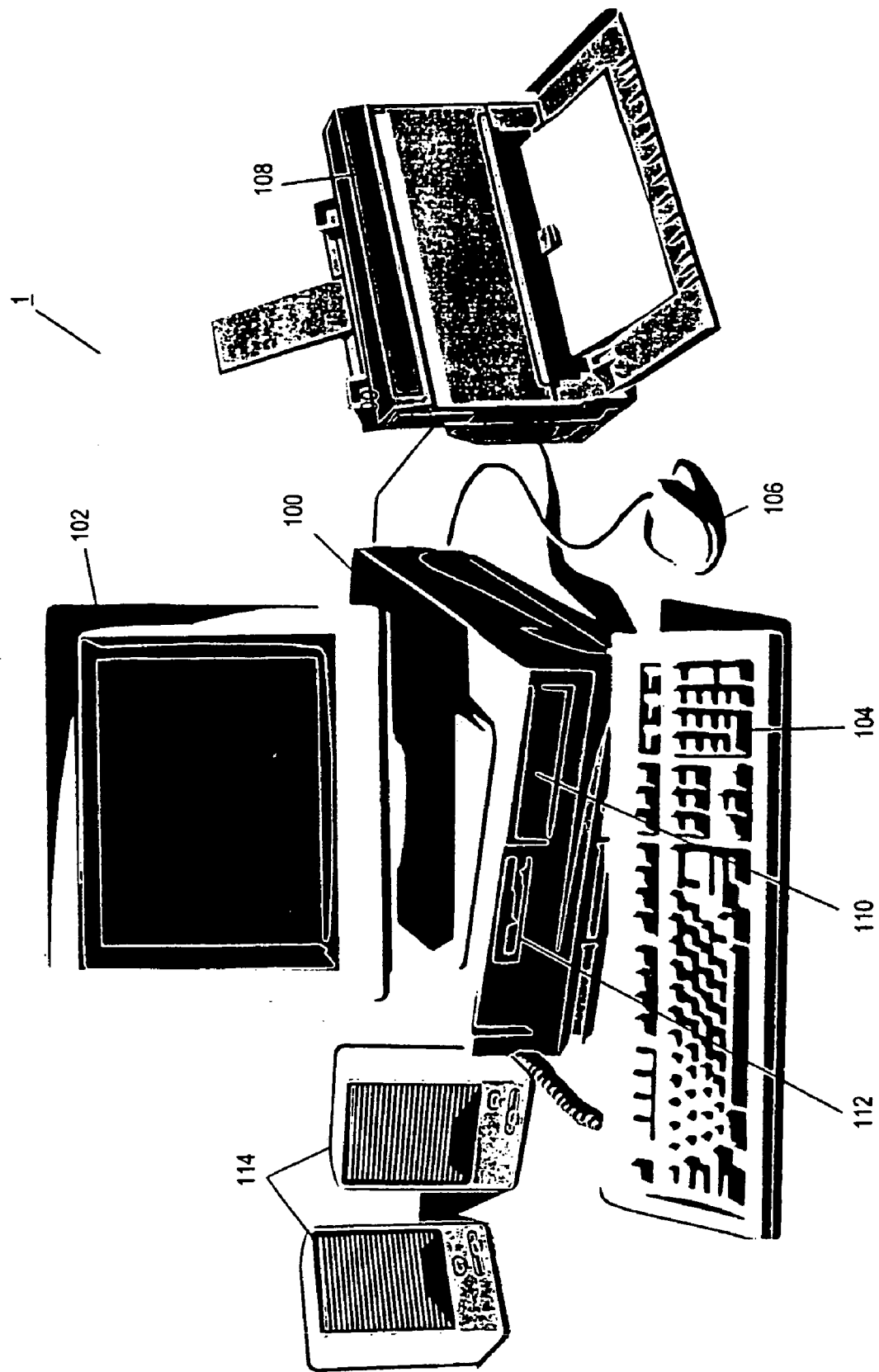
FIG. 2 is a drawing of a general purpose computer which may be used as the server 2 of the present invention.

FIG. 2 illustrates a general purpose computer system which may act as the server 2 within the embodiments of the present invention. Later, the operation of the embodiments of the invention will be described in the general context of computer executable instructions, such as program modules, being executed by a computer. Such program modules may include processes, programs, objects, components, data structures, data variables, or the like that perform tasks or implement particular abstract data types. Moreover, it should be understood by the intended reader that the invention may be embodied within other computer systems other than those shown in FIG. 2, and in particular, notebook computers, main frame computers, mini computers, multi processor systems, distributed systems, etc. Within a distributed computing environment, multiple computer systems may be connected to a communications network and individual program modules of the invention may be distributed amongst the computer systems.

With specific reference to FIG. 2, a general purpose computer system 1 which forms the server provided by the embodiments of the invention comprises a desk-top chassis base unit 100 within which is contained the computer power unit, mother board, hard disk drive or drives, system memory, graphics and sound cards, as well as various input and output interfaces. Furthermore, the chassis also provides a housing for an optical disk drive 110 which is capable of reading from and/or writing to a removable optical disk such as a CD, CDR, CDRW, DVD, or the like. Furthermore, the chassis unit 100 also houses a magnetic floppy disk drive 112 capable of accepting and reading from and/or writing to magnetic floppy disks. The base chassis unit 100 also has provided on the back thereof numerous input and output ports for peripherals such as a monitor 102 used to provide a visual display to the user, a printer 108 which may be used to provide paper copies of computer output, and speakers 114 for producing an audio output. A user may input data and commands to the computer system via a keyboard 104, or a pointing device such as the mouse 106.

It will be appreciated that FIG. 2 illustrates an exemplary embodiment only, and that other configurations of computer systems are possible which can be used with the present invention. In particular, the base chassis unit 100 may be in a tower configuration, or alternatively the computer system 1 may be portable in that it is embodied in a lap-top or notebook configuration.

Figure 3:
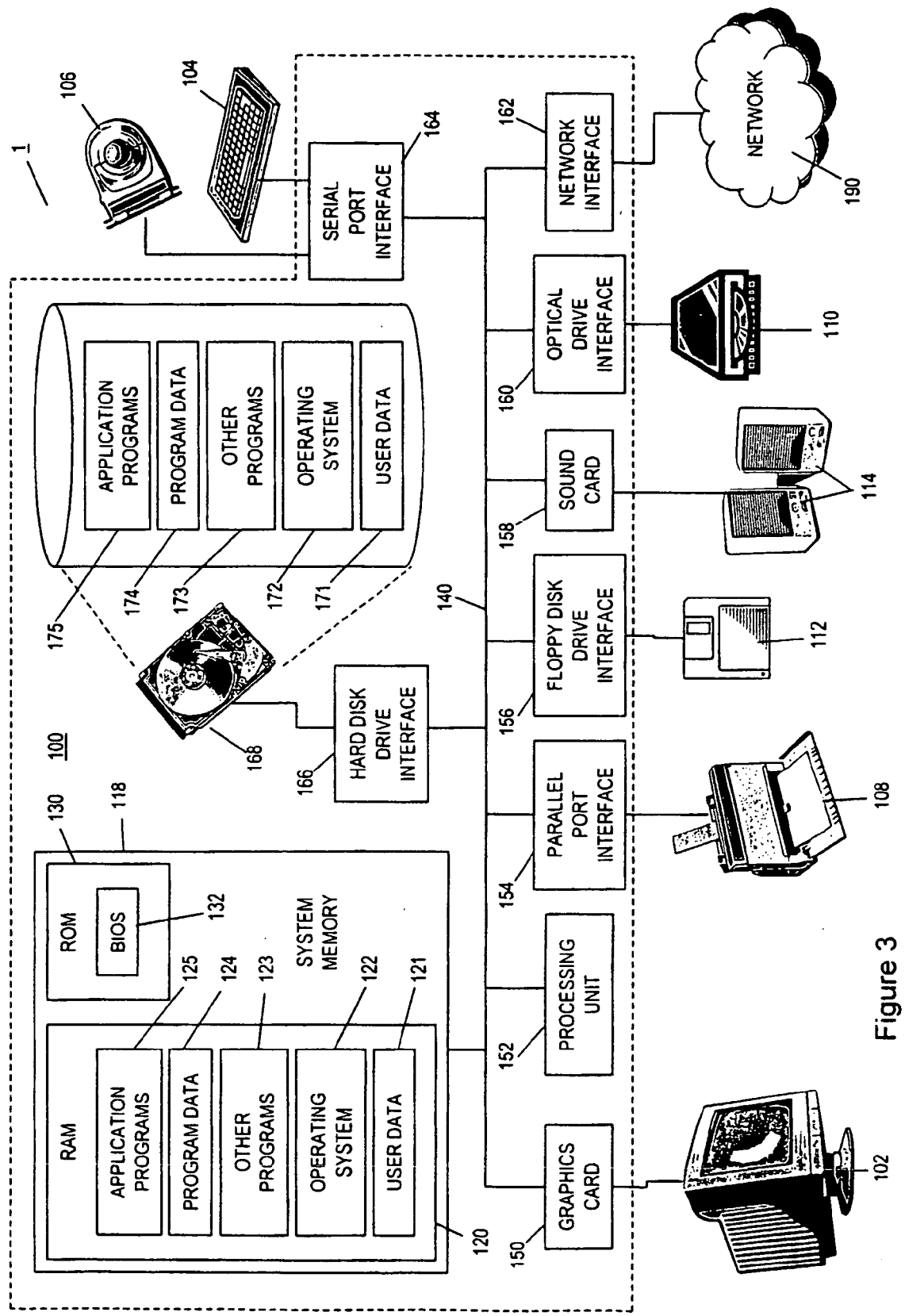
FIG. 3 is a system architecture block diagram illustrating the primary components of the general purpose computer system of FIG. 2.

FIG. 3 illustrates a system block diagram of the system components of the computer system 1. Those system components located within the dotted lines are those which would normally be found within the chassis unit 100.

With reference to FIG. 3, the internal components of the computer system 1 include a mother board upon which is mounted system memory 118 which itself comprises random access memory 120, and read only memory 130. In addition, a system bus 140 is provided which couples various system components including the system memory 118 with a processing unit 152. Also coupled to the system bus 140 are a graphics card 150 for providing a video output to the monitor 102; a parallel port interface 154 which provides an input and output interface to the system and in this embodiment provides a control output to the printer 108; and a floppy disk drive interface 156 which controls the floppy disk drive 112 so as to read data from any floppy disk inserted therein, or to write data thereto. In addition, also coupled to the system bus 140 are a sound card 158 which provides an audio output signal to the speakers 114; an optical drive interface 160 which controls the optical disk drive 110 so as to read data from and write data to a removable optical disk inserted therein; and a serial port interface 164, which, similar to the parallel port interface 154, provides an input and output interface to and from the system. In this case, the serial port interface provides an input port for the keyboard 104, and the pointing device 106, which may be a track ball, mouse, or the like.

Additionally coupled to the system bus 140 is a network interface 162 in the form of a network card or the like arranged to allow the computer system 1 to communicate with other computer systems over a network 190. The network 190 may be a local area network, wide area network, local wireless network, or the like. The network interface 162 allows the computer system 1 to form logical connections over the network 190 with other computer systems such as servers, routers, or peer-level computers, for the exchange of programs or data. In particular, within the present embodiments the network interface 162 is particularly arranged to allow the server to communicate with the SMSC 12 for the sending and receipt of SMS data, and to allow the server to communicate via the internet with the user computer 26. In this latter respect, it should be understood that two or more network interfaces 162 may be provided as appropriate to facilitate these different functions.

In addition, there is also provided a hard disk drive interface 166 which is coupled to the system b 140, and which controls the reading from and writing to of data or programs from or to a hard disk drive 168. All of the hard disk drive 168, optical disks used with the optical drive 110, or floppy disks used with the floppy disk 112 provide non-volatile storage of computer readable instructions, data structures, program modules, and other data for the computer system 1. Although these three specific types of computer readable storage media have been described here, it will be understood by the intended reader that other types of computer readable media which can store data may be used, and in particular magnetic cassettes, flash memory cards, tape storage drives, digital versatile disks, or the like.

Each of the computer readable storage media such as the hard disk drive 168, or any floppy disks or optical disks, may store a variety of programs, program modules, or data. In particular, the hard disk drive 168 in the embodiment particularly stores a number of application programs 175, application program data 174, other programs required by the computer system 1 or the user 173, a computer system operating system 172 such as Microsoft® Windows®, Linux™, Unix™, or the like, as well as user data in the form of files, data structures, or other data 171. The hard disk drive 168 provides non volatile storage of the aforementioned programs and data such that the programs and data can be permanently stored without power.

In order for the computer system 1 to make use of the application programs or data stored on the hard disk drive 168, or other computer readable storage media, the system memory 118 provides the random access memory 120, which provides memory storage for the application programs, program data, other programs, operating systems, and user data, when required by the computer system 1. When these programs and data are loaded in the random access memory 120, a specific portion of the memory 125 will hold the application programs, another portion 124 may hold the program data, a third portion 123 the other programs, a fourth portion 122 the operating system, and a fifth portion 121 may hold the user data. It will be understood by the intended reader that the various programs and data may be moved in and out of the random access memory 120 by the computer system as required. More particularly, where a program or data is not being used by the computer system, then it is likely that it will not be stored in the random access memory 120, but instead will be returned to non-volatile storage on the hard disk 168.

In the presently described embodiments of the invention, the user records 22 are stored in the user data 171 area of the hard disk 168, and are moved into the user data area 121 of the RAM 120 when required for processing. Similarly, the user registration program 16, link creation program 18, and searching program 20 are stored in the application programs area 175 of the hard disk, and read into the application programs area 125 of the RAM 120 when required for execution.

The system memory 118 also provides read only memory 130, which provides memory storage for the basic input and output system (BIOS) containing the basic information and commands to transfer information between the system elements within the computer system 1. The BIOS is essential at system start-up, in order to provide basic information as to how the various system elements communicate with each other and allow for the system to boot-up.

Whilst FIG. 3 illustrates one arrangement of the server means of the invention, it will be understood by the skilled man that other peripheral devices may be attached to the computer system, such as, for example, microphones, joysticks, game pads, scanners, or the like. In addition, with respect to the network interface 162 it should also be understood that the computer system 1 may be provided with a modem attached to either of the serial port interface 164 or the parallel port interface 154, and which is arranged to form logical connections from the computer system 1 to other computers via the public switched telephone network (PSTN).

Where the computer system 1 is used in a network environment, it should further be understood that the application programs, other programs, and other data which may be stored locally in the computer system may also be stored, either alternatively or additionally, on remote computers, and accessed by the computer system 1 by logical connections formed over the network 190.

Although the above description relates to the server 2 provided by the embodiments of the invention, it will also be understood that the same general computer architecture may also be employed as the user computer 26.

Figure 4:
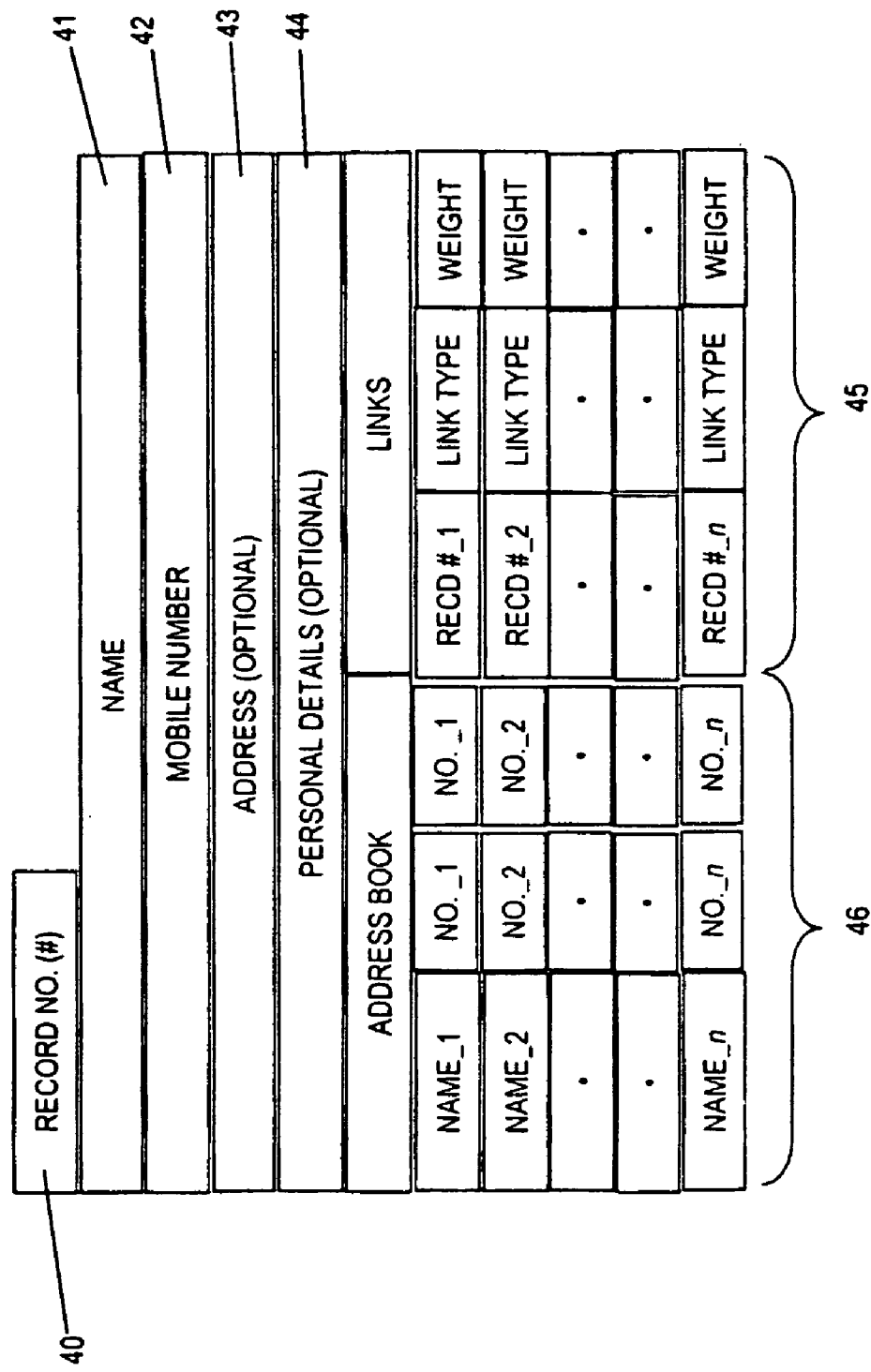
FIG. 4 is a graphical representation of a user record as used in the embodiments of the present invention.

Next, the format of the user records 22 will be described, and in particular with respect to the format of a single user record, as shown in FIG. 4.

With reference to FIG. 4, in order to use the directory enquiries service provided by the embodiments of the invention, a user must first register with the service such that a user record is created for the user. This is achieved by the user contacting the DQ server 2 by one of the various interfaces described earlier (i.e. the call centre, SMS, or over the Internet) and providing his personal details including name and mobile telephone number, and also preferably providing name and telephone number details from his mobile telephone address book. A user record is then created for the user which incorporates this data. FIG. 4 illustrates the various fields of a single user record.

A user record comprises a unique record number 40, stored in a record number field. Furthermore, the record also comprises a name field 41 for storing the user name, and a mobile telephone number field 42 for storing the user's mobile telephone. Moreover, address fields 43 and personal details field 44 may optionally be provided for storing address and other personal details data.

In addition to the above described personal data for the user, the user record is also used to store address book entries provided by the user from his mobile phone address book. Therefore, a plurality of address book entries 46 are stored, each of which contains a name field, and two telephone number fields. The first of these telephone number fields is to store the telephone number as originally provided by the user for the corresponding name field. The second of the telephone number fields is to store the current telephone number which the directory enquiry system may have determined is now associated with the name given in the corresponding name field. Clearly, when an address book entry is first stored in the user record, the original telephone number field should be identical to the current telephone number field, provided the entries are up to date in the user's own mobile telephone address book. However, as time goes on it may be that that the telephone number associated with the corresponding name field is determined by the DQ system to have changed, in which case the current telephone number field can be updated with this number. This ensures that the original telephone number which was first provided by the user corresponding with the provided name is retained, but that where possible an updated number is also stored such that the address book 46 is maintained up to date. A plurality of address book entries can be stored in a user record, and preferably sufficient data storage space is provided to allow as many address book entries as may reasonably be required.

In addition to the above fields, each user record also stores a number of links fields 45. Each link comprises three individual fields, being a record number field, a link type field, and a weight field. Essentially, all a link comprises is a recognition that the name or (preferably, due to the possible large number of users with the same name) mobile telephone number of a particular user record can be found in the address book of another user record. Where this is the case, the record number of that other user record is stored as a link, and the link type field is set to that of "address book_1", to indicate that the present user's number was found in the linked to user's address book. An optional weight field can be included which gives some indication as to how "important" this link is, in that during search procedures the link may prove useful in obtaining accurate search results. When a link is first created the weight field is set to an initial value.

In addition to recording the record numbers of other user records for which the name or telephone number of the present user record is found in the other user records address book, within the embodiments the record numbers of user records containing the name and telephone numbers found in the particular user record's own address book are also stored as links. Thus, for example, where the present user record contains an address book entry "name_1" and "number_1" a link will be stored in the link fields 45 to the record number which has "name_1" stored in its name field 41, or which has "number_1" stored in its mobile number field 42. Here, the link type is saved as "address book_2" to indicate that the link indicates a "direction" from the present user to another user i.e. that the linked-to user's number was found in the present user's address book, and an initial weight value will be stored in the weight field. It should be understood that the use of the weight field in entirely optional, but will be discussed later with respect to how the user records may be searched.

Thus, for a particular user record the personal details of the user are stored therein, together with address book entries, and link data linking the user record to other user records. Further details about the creation and storage of the link information will be described next with respect to FIGS. 5, 6, and 7.

The process which is performed when a new user registers with the DQ server 2 will now be described with respect to FIG. 5.

When a user communicates with the DQ server 2 via one of the interfaces previously described, and indicates that he wishes to register for the directory enquiries service, the DQ server 2 executes the user registration program 16, which controls the user registration process. The process flow of this program is shown in FIG. 5, described next.

Firstly, at step 5.2 the DQ server 2 receives the personal details of user A. These details include the name of user A, and the mobile telephone number. Optionally, as already described, the details can further include user A's address, as well as other personal details such as date of birth, occupation, marital status, or the like. Having received these details from user A, at step 5.4 the user registration program controls the DQ server 2 to create a new record for user A and stores the record in the user record storage 22. Then, at step 5.6 the DQ server 2 populates the user record created for user A with the details obtained from user A at step 5.2. The user record for user A thus populated with user A's details is then saved in the user records store 22. Thus, at this time, with reference to FIG. 4, the user record for user A will comprise a record number in the record number field 40, and entries in the name field 41 and mobile telephone number 42. Optionally, address details may have been entered in the address field 43, and personal details in the personal details field 44. At this time, there will be no address book entries 46, or link data 45.

Having saved the user A record in the data base, at step 5.10 the user registration program 16 controls the DQ server 2 to perform link creation to the new user A record, by executing part of the link creation program 18. The process performed by the DQ server 2 under the control of the link creation program 18 at step 5.10 is shown in FIG. 7, and will now be described in detail.

Figure 7:
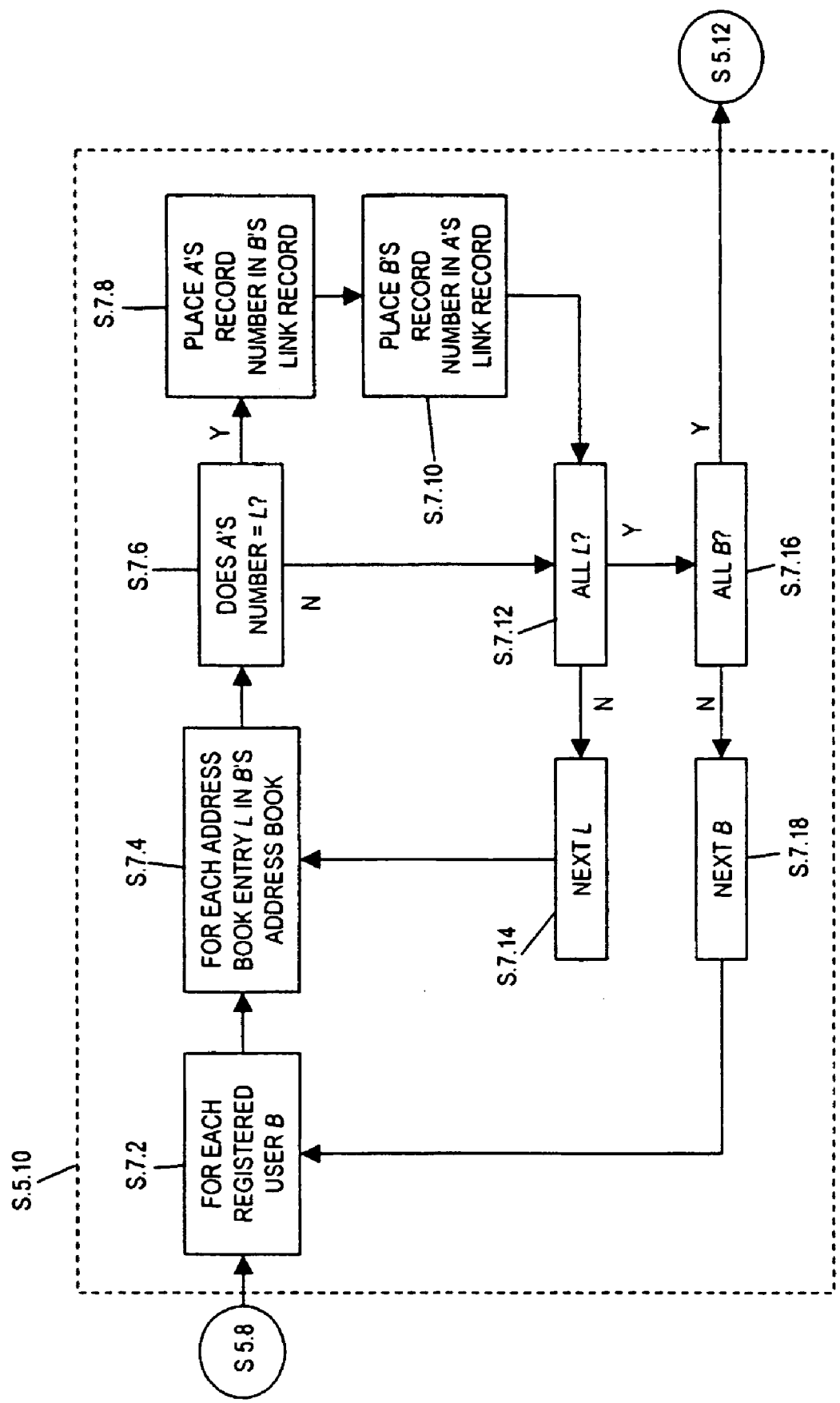
FIG. 7 is a flow diagram illustrating the link creation process to a new user record in the embodiments of the invention.

With reference to FIG. 7, at step 7.2 the DQ server 2 initiates a FOR processing loop to process the user records of every other registered user B for which user records are stored in the user record storage area 22. Next, at step 7.4, the link creation program controls the DQ server 2 to initiate a second, nested FOR loop so as to process each address book entry L in each user B's address book. Thus, at this point the DQ server 2 is looking through every user record, and at every address book entry in every user record.

Next, at step 7.6 a comparison is made as to determine whether or not user A's telephone number equals the telephone number given in the present address book entry L being processed, in the present user record B which is being processed. If this is the case at step 7.8 the record number of user A's record is placed in user B's link record as a new link. That is, a new link record is established in user B's link record fields, and which contains user A's record number in the record number link field, and which will have the code for "address book_2" in the link type field. An initial weight value may be stored in the associated weight field if used. In this way, a link is established from the user B to the user A.

Next, at step 7.10 the same process is repeated, but this time user B's record number is placed in user A's link record, that is, a link is established in user A's user record which contains user B's record number in the record number link field, and which contains the code "address book_1" in the link type field. An initial weight value may be stored in the optional weight field of the link, if used. In this way, a reciprocal link is established between user A's record, and the record of the user B. Following this step, processing proceeds to step 7.12, wherein an evaluation is made as to whether all of the address book entries L in the user B's address book have been processed. Similarly, if the evaluation at step 7.6 returns negative, then processing also proceeds to step 7.12.

If it is determined that not all of the address book entries L in B's address book have been processed, then processing proceeds to step 7.14, wherein the next address book entry is selected, and then the nested FOR processing loop commences once again by the procedure returning to step 7.14.

If, on the other hand at step 7.12 it is determined that all of the address book entries L have been processed in a particular user B's address book, then at step 7.16 an evaluation is made as to whether all of the registered users' address books have been processed. If this is the case then the link creation step 5.10 is completed and processing proceeds to step 5.12 on FIG. 5. On the contrary, if step 7.16 returns a negative value, and all of the registered users' address books in the user records store 22 have not been processed, then the next registered user is selected at step 7.18, and the outer FOR processing loop is repeated, with processing returning to step 7.2. Due to this processing, each address book entry in every registered user's address book as stored in the user records 22 is searched for the user A's telephone number, and reciprocal links are established both in user A's user record, and in each of the other registered users user record in which user A's telephone number was found. Thus, with reference to FIG. 4, at this point in the procedure of FIG. 5, user A's user record contains not only the details in the fields 41 to 44, but may also contain link data in the links field 45 indicating links to other user records in which user A's mobile telephone number as given in the field 42 of the user record was found.

Returning to FIG. 5, after step 5.10 the DQ server 2 is then in a position to receive address book entries from the user who is registering. Note that it may be that the user does not wish to send any address book entries, in which case the user registration program 16 may suspend its operation in respect of the particular user who is registering, until the user sends an address book entry to the DQ server 2. However, at some point it is envisaged that the user will transmit an address book entry to the DQ server 2, which is received at step 5.12. This initiates the processing of step 5.14, wherein link creation is performed on the received address book entry N. This procedure of step 5.14 is shown in more detail in FIG. 6, a description of which is given next.

Having received an address book entry from the user A, the entry is parsed, and the telephone number N present in the entry determined. Then, at step 6.2 a database search of all the user records is performed for N. In this respect, the mobile telephone field 42 of each user record in the user record store 22 is examined to determine whether it is the same as the number N supplied in the address book entry from user A. At step 6.4 an evaluation is determined as to whether or not N has been found in any of the user records, and if not then processing proceeds to the optional step 6.12, wherein the DQ server 2 sends an SMS message to the number N advertising its directory enquiries service. It should be noted that this is an optional step that need not be performed. After step 6.12, however, processing returns to the procedure of FIG. 5 for the particular address book entry N which was received, and step 5.16 would be performed.

Alternatively, if the evaluation at step 6.4 returns a positive result, in that the number N has been found in the database, then at step 6.6 the record of the user B which had the number N in the mobile telephone field 42 thereof is retrieved from the user records store 22. Then, at step 6.8 the record number of user B's record is placed in user A's link record, as a new link. That is, user B's record number is placed in the record number field of the link, and the link type field is updated to read "address book_2". An additional initial weight value may be entered in the weight field if used.

Similarly, in order to reciprocate the link, at step 6.10 user A's record number is placed in user B's link record, in the same manner as described above. That is, a new link record is established, with user A's record number in the record number link field and with the link type "address book_1". An optional initial weight value may also be included in the weight field, if used. Following step 6.10, processing proceeds to step 5.16 of FIG. 5, and the particular address book entry N is deemed to have been processed.

Returning to FIG. 5, at step 5.16 an evaluation is made as to whether all address book entries have been received from the user A, and if not then processing returns to step 5.12 wherein a second address book entry may be received. Alternatively, if it is determined that all address book entries have been received, then the user registration process as controlled by the user registration program 16 ends. Note that step 5.16 may be evaluated simply by sending an SMS message to the user asking him to reply as to whether or not he has finished sending address book entries. Such a request is equally achievable over either the voice channel or the internet channel also. After the conclusion of the process of FIG. 5, i.e. that controlled by the user registration program 16, the user record for user A will be fully populated with the personal details given in fields 41 to 44, any links appropriate, which will all be of link type "address book_1" or "address_book_2" (dependent on whether the links are to or from another user), and whatever address book entries 46 which the user A cared to transmit to the DQ server 2. Therefore, the user A record is substantially complete at this point.

With respect to the link types mentioned above, as described previously each of the links so far created has been of the type "address book_2" or "address_book_1" and this is because each of the links is created as a result of the number being found either in user A's own address book, or in one of the other registered user's address books, respectively. Within the embodiments, however, a second link type is possible being that of "search" which indicates that a link was created as a result of a successful search for a number. Further details of this link type will be given later, however.

Figure 8:
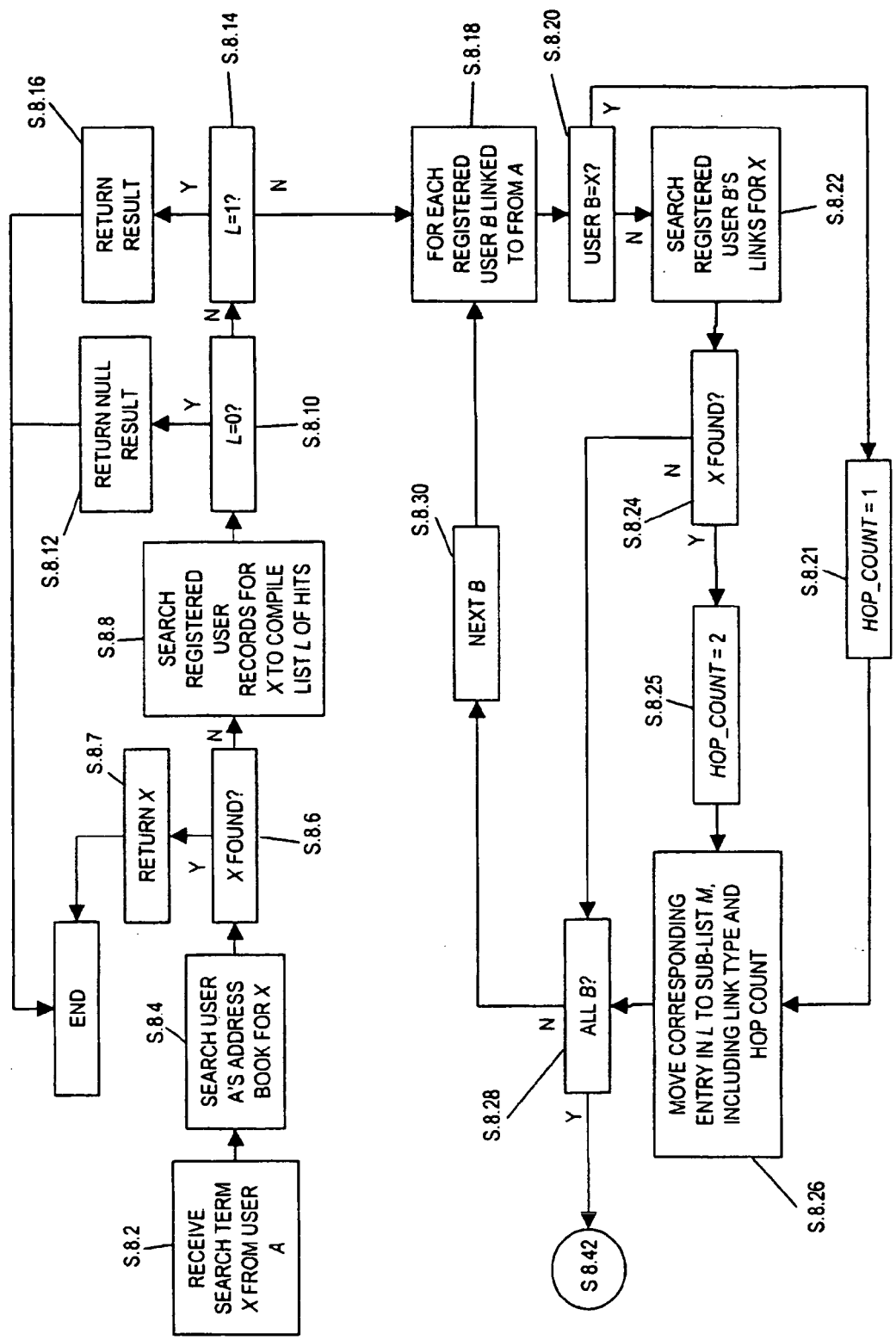
FIG. 8 is a flow diagram illustrating part of a first search process used in a first embodiment of the present invention.

Having described how the majority of links are created using address book data according to the embodiments of the invention, we turn now to how these links can be used to search the user records 22 in such a manner as to give increased accuracy of results. We described two particular search processes herein, but it should be understood by the intended reader that the link data derived as described above can be used in many ways to search the database. The two different search processes to be described herein are described in respect of a first embodiment, and a second embodiment of an invention. The first embodiment will be described first, with respect to FIGS. 8 and 9.

Assume that the DQ server 2 has received a search request from a registered user of the directory enquiries server, via one of the interfaces into the server. The search request includes a search term X received from the user A, who has transmitted the request. The request is received at step 8.2.

After having received the request from the user A, the DQ server 2 parses the search term X, and then accesses user A's record from the user record store 22, and searches user A's address book for the search term X at step 8.4. An evaluation is made at step 8.6 as to whether X is found in the user A's address book, and if so at step 8.7 the name and current telephone number returned by the search term X are passed to the user at step 8.7. The search process then ends. It will be appreciated that the above described process involving steps 8.2 to 8.7 is relatively straight forward and does not make use of the link data previously determined. However, the link data is used if X cannot be found in the user A's address book, as described next.

If the evaluation at step 8.6 returns negative i.e. X has not been found in the user A's address book, then at step 8.8 a record search is undertaken to search the registered user records for the search term X to compile a list L of possible hits. This search involves searching through the name fields 41 of each user record to determine whether or not the search term X received from the user A matches thereto, either substantially, or exactly.

Next, at step 8.10 an evaluation is undertaken as to whether the compiled list of possible hits has any members, and if not then a null result is returned at step 8.12, and the search process finishes. If L does have members, however, then processing proceeds to step 8.14, wherein a second evaluation is undertaken to determine whether the list L has only one result. If this is the case, then at step 8.16 a result is returned, whereupon the process then ends. If this is not the case, however, then it must be the case that L has more than one member, in which case processing proceed to step 8.18.

Here, at step 8.18 a FOR processing loop is initiated wherein the records of each registered user B who is linked to from A are to be processed. Within the FOR loop, at step 8.20 an evaluation is performed to determine whether the present user B which is being processed by the loop corresponds to the search term X. Another way of putting this is to check whether or not the present user B is listed in the list L of possible hits, as if so this will be because B has been determined at step 8.8 to match the search term X.

If the evaluation returns positive, and the user B does match the search term X, then processing proceeds to step 8.21, wherein a variable hop_count is initiated to 1. The purpose of this variable is to record how far away from the user record of user A (who requested the search) the user record of the present user B who has been found to match the search term X is in terms of the number of links from A. In the present case, as the user B has been found by following a link directly from A the user B is located only one link or "hop" from A, and hence the hop_count variable is set to 1.

Following step 8.21, processing proceeds to step 8.26, wherein the entry in L which corresponds to the present user B who is being processed is moved to a sub-list M. This sub-list represents a final short-list of possible candidates to match the search term X, and is contains the details of those members of the initial results list L who have been found to lie within a certain number of hops from the user record of user A, as determined by the link information for each record.

In addition to moving the corresponding entry in L to the sub-list M, at step 8.26 the value of the hop_count variable for the present user B being processed is also saved with the entry from L in the sub-list M. Where step 8.26 has been entered from step 8.21, the value of the hop_count variable will always be 1. In addition, details of the link-type which links the user B to that of A are also stored in the sub-list. This information may be used later in the search process to rank the entries in the sub-list M into a final order of potential relevance to match the search term X.

Following step 8.26, at step 8.28 an evaluation is performed to determine whether or not the user record of each registered user B linked to from user A's user record has been processed according to the FOR loop. If this is not the case, then at step 8.30 the next entry in the list is selected, and the outer FOR loop is recommenced at step 8.18. Alternatively, if the evaluation of step 8.28 returns a positive result, then processing proceeds to the second part of the searching algorithm, shown on FIG. 9 and discussed later.

Returning to step 8.20, if the evaluation at step 8.20 returns a negative value, in that the present user B who is being processed does not match the search term X, then processing proceeds to step 8.22, where a search is initiated to search each of the user records linked to from user B's user record, to determine if any of those linked records match to the search term X. An evaluation as to whether or not a particular linked record matches to the search term X is then made at step 8.24.

Although not depicted so on the diagram, steps 8.22 and 8.24 would in practice involve a processing loop to search each of the user records linked to from the user record of the user B who is presently being processed, so that every record linked to from B can be compared with the search term. If any linked record matches to the search term i.e. the evaluation of step 8.24 returns positive, then at step 8.25 the variable hop_count is set to 2, to reflect that the linked record which matches the search term is in fact 2 hops from the user record of user A who requested the search (one hop to the user B, and then a second hop from user B to the record that matches the search term). Following step 8.25, at step 8.26 the corresponding entry in the results list L to the linked user record which has been found to match is moved to the sub-list M. Also stored in the sub-list is the hop_count value (in this case 2), and the types of the links from user A's user record to the matching user record.

The net result of the process described above is that the searching process is driven from the user record of the user A who requested the search outwards along the links to search the user records which are linked to user A's record (one hop away), and then further to search the user records which are further linked from those records (i.e. two hops away). Where an entry in the list L of hits is found in one of these address books so searched, then it is moved to a sublist M for further processing. The sublist M of results therefore represents an effective "short list" of search results, as determined by the fact that each of the results present in the list M can be found in the address book of a user record either linked to directly from user A's record, or linked to from a user record which is in turn then linked to user A's record. This is a direct application of the "small world" theory mentioned earlier in the summary of invention portion of the description, and which takes the search to a maximum depth of two hops away from the user record of the user who requested the search.

Figure 9:
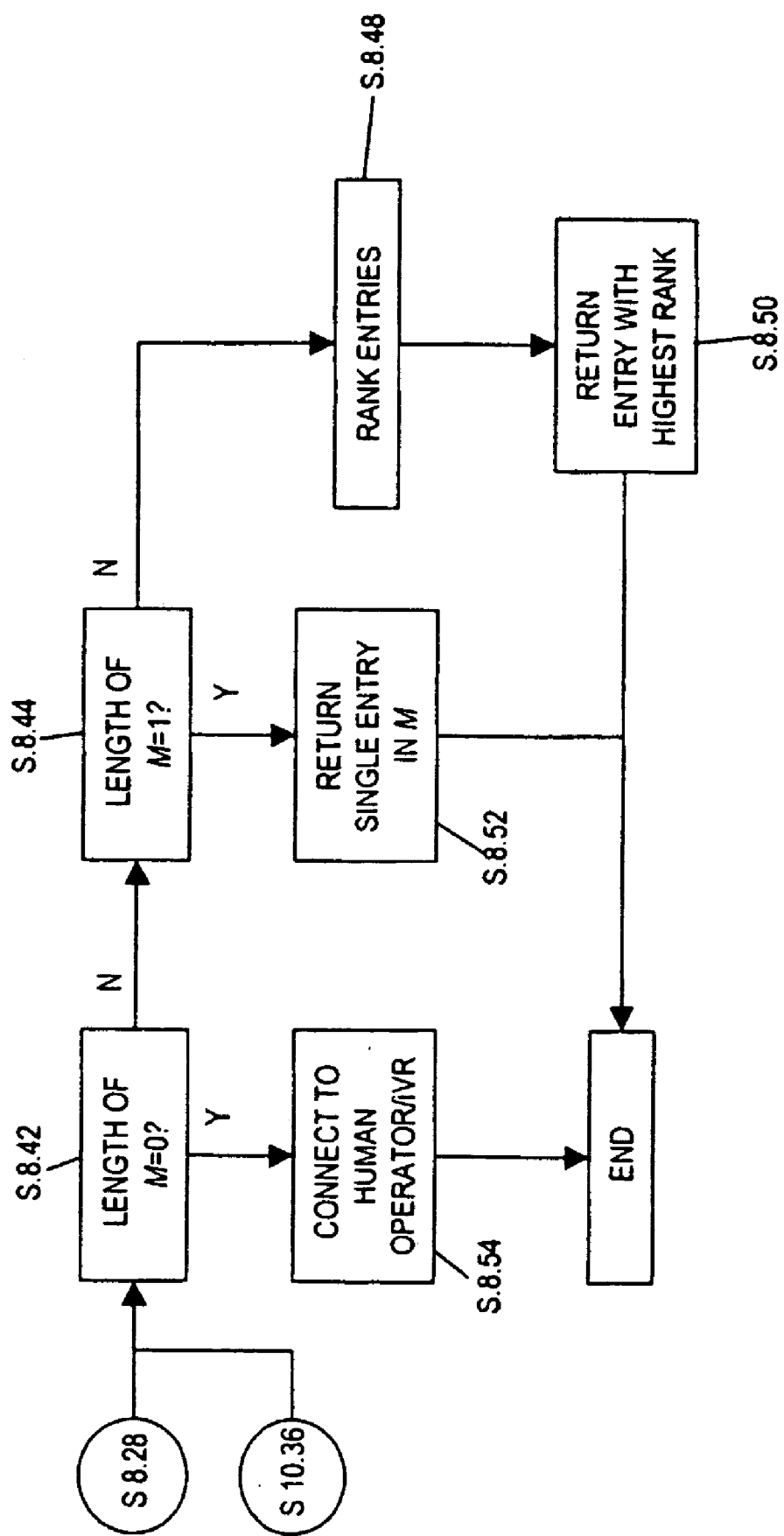
FIG. 9 is a flow diagram illustrating a second part of a search process used in the first embodiment of the present invention.

Turning to FIG. 9, FIG. 9 illustrates the remainder of the search algorithm of the first embodiment. If the step 8.28 of FIG. 8 indicates that all of the user records of the registered users B linked to from the user A user record have been processed, then processing proceeds to step 8.42 wherein the list M compiled by the step 8.28 is analysed to determine whether the length is zero. If this is the case, then it means that the search algorithm has been unable to determine a match using the link information, and in this case it is proposed to connect the user making the search request to a human operator in the call centre 4 or perhaps to an interactive voice response computer, such as are known in the art for directory enquiries services. Such a connection will take place at step 8.54, whereupon the search process would then end.

If, however, at step 8.42 it is determined that the list M has one or more entries, then at step 8.44 a second evaluation is performed which checks whether the list M has only one entry. If this is the case then processing proceeds to step 8.52 wherein the single entry in M is returned as the search result. Processing then ends. On the contrary, if the evaluation of step 8.44 returns a negative, then it must be that the list M has more than one entry. In this case processing proceeds to step 8.48.

Here, at step 8.48 the entries in the list M are ranked into order, and then at step 8.50 the entry with the highest rank is returned. The searching process then ends.

The ranking procedure performed at step 8.48 can be performed in a number of ways. One possible option is to use the weight values which may be optionally stored in the link record for each link in a user record. More particularly, it will be recalled that at step 8.26 when an entry in the list L is moved to the sublist M, information indicative of the link which caused the entry to be moved is also included, and this information may include a weight attached to the link. These weights can be used to indicate for any particular link how successful it has been in the past at producing an accurate search result, and hence the weight can be used to rank the entries in the list M into order by link weight. In such a case, the entry in the list M which was returned from the link with the highest weight will be ranked first, whereas the entry in the list M from the link with the lowest weight will be ranked last and so on in order through the list M. When a link is first created it must be given an initial weight which may lie midway in the range of available weights. As a particular link is used by the searching algorithm, the respective weight for the link can be incremented or decremented in dependence on whether or not a link has caused an entry to be moved to the sublist M. Therefore, where a link is more successful in producing candidate results for the shortlist of results, then its weight may be increased. In this way, links which often return candidate results may have a higher weight, which can be used in subsequent ranking of candidates in the sublist M.

It is also possible to rank the entries in the sublist M according to step 8.48 in other ways. For example, it may be that the same candidate user record may be found in M more than once, in which case a ranking may be performed by placing those user records which are found in M the most times at the top of the ranking, with those numbers which are only found in M once or the fewer times towards the bottom of the ranking. This ranking works on the assumption that the more times a particular number is found in the address books of user records which are linked to A (either by one or two hops), then the more probability it is that that is the number which A himself is looking for. It will be appreciated that such an alternative method does not employ the weights for each link, and hence with such a method the weights could be omitted in the link data 45.

A third ranking method is to use the hop_count variable saved with each entry in the list M. In this case, the assumption is made that the lower the hop count for an entry then the potentially more relevant the result, and hence the list M can be sorted into order based on the hop count for each entry, with those entries with lower hop counts at the top of the list. It will be appreciated that in the present embodiment where only two hop count values are possible that it may be necessary to also perform an additional ranking method such as those described previously to further order the results.

More particularly, it will be understood that the above described ranking methods may be combined in any order, such that ordering of the sub-list M occurs according to two or more of the ranking processes. As one example combination, the sub-list M may be ordered according to hop count, and then further ordered according to respective link weights. This would result in those entries with the lowest hop count being towards the top of the list, and then those results being themselves arranged according to weight value with those entries with the highest (or conversely the lowest, depending upon the precise arrangement of the weight values) weight value being towards the top of the list, and vice versa. Alternatively, other combinations of the ranking methods would also be possible, but it should be noted that it is likely that each combination would produce a different ordering of the results.

The most appropriate combination of ranking processes for any particular sub-list M would depend on the precise make-up of the entries in the list. For example, if all the entries have the same hop count then ordering by hop count achieves nothing, and hence it would be more appropriate to use the other ranking processes. Likewise, if all the entries in the list are included the same number of times, then the second ranking process which ranks according to the number of times an entry is found in a list would also be inappropriate. In such cases then ranking by one or more of the other available ranking process is desirable.

Thus the search algorithm of the first embodiment makes use of the links and the weights attached thereto to differentiate between a list of possible results, by driving the search from the user record of the user A who has made the search result along the links established between user records so as to filter a list of results established by a universal search according to "distance" from the user A user record. In particular, only those results which are within a certain number of hops from user A are considered as candidates for further processing, and hence this search algorithm embodies the small-world theory mentioned earlier, although only to a hop depth of two.

Figure 10:
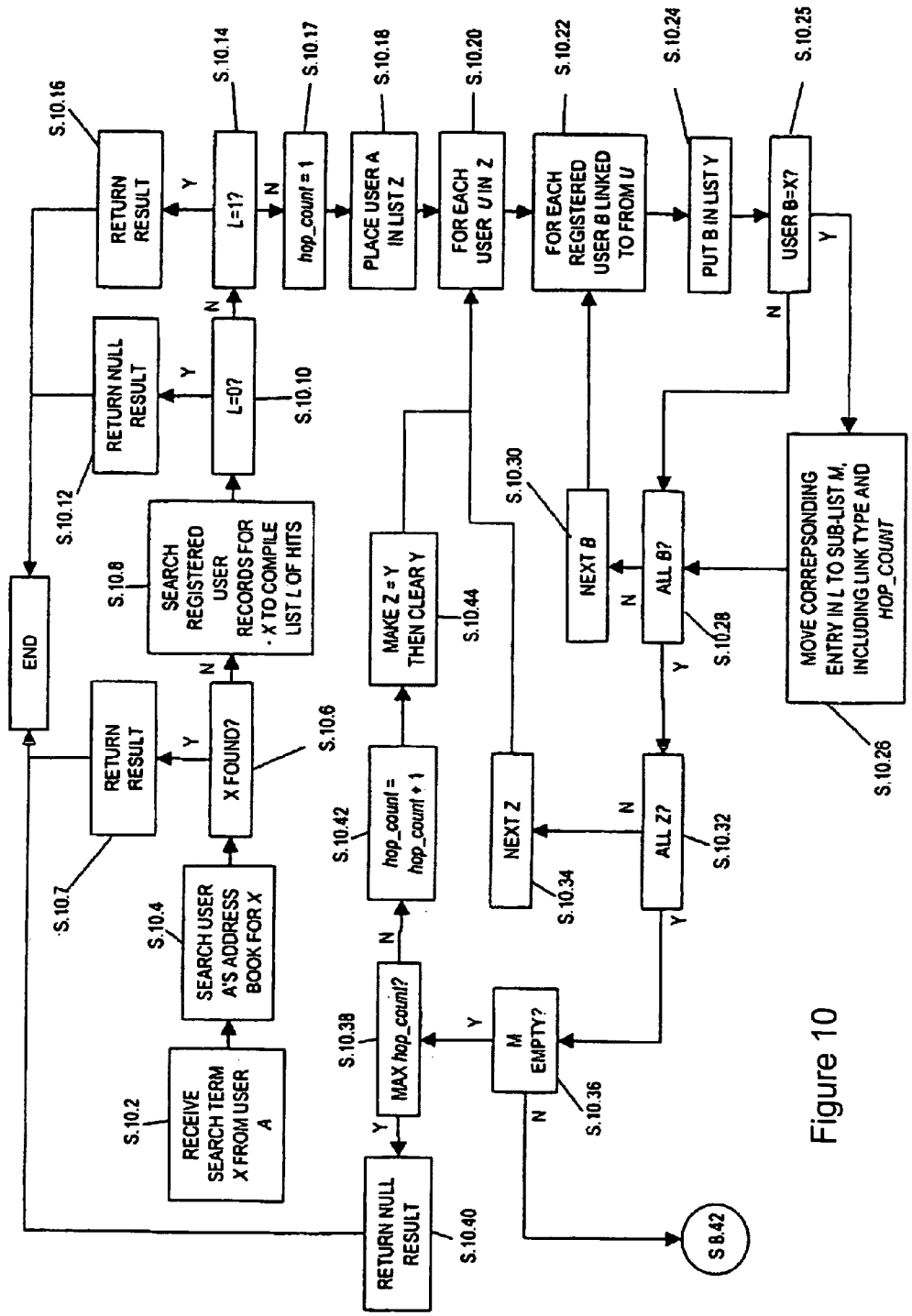
FIG. 10 is a flow diagram illustrating a search process used in a second embodiment of the present invention.

We mentioned earlier that there are several possible ways how the link data could be used to search the user records, and hence a second searching algorithm which forms a second embodiment of the invention will now be described with reference to FIG. 10. This second search algorithm of the second embodiment shares much in common with that previously described in the first embodiment, and in particular each of the steps 8.2 to 8.16 of FIG. 8. That is, in FIG. 10 the steps 10.2 to 10.16 are respectively identical to those of steps 8.2 to 8.16 of the search algorithm from the first embodiment, and hence no further discussion of the steps 10.2 to 10.16 of the search algorithm from the second embodiment will be undertaken. In addition, the processing performed by the search algorithm of the second embodiment is closely related to that of the first embodiment, but with the important difference that it is capable of searching the links to any preset depth, and in particular to a pre-set maximum depth. Within the second embodiment the general assumption is made that a result with as lower a hop count as possible is potentially more relevant than a result with a higher hop-count. The following description of the search algorithm of the second embodiment therefore proceeds from step 10.14, to that of step 10.17.

At step 10.17, it must be the case that the list L of hits has more than one member, due to the evaluations performed at step 10.10 and 10.14. At step 10.17, prior to initiation of the main processing loop, a variable hop_count is initialised to 1. As in the previously described first embodiment, the variable hop_count is required to keep a count of the number of links between a particular user record and the user record of the user A who made the search request.

Following step 10.17, at step 10.18 the identity of user A (which may conveniently be the user record number of the user A's user record) is placed into a list Z, as a precursor to the main processing loop commencing.

Next, at step 10.20 a FOR processing loop is started, which acts to process every user U in the list Z. On the first iteration of the loop the list Z has only one member, being the user A who made the search request. On future iterations the list Z may have more than one member, as will become clear later.

Within the outer FOR loop started at step 10.20 a second, nested FOR loop is started at step 10.22, which acts to process every registered user record B which is linked to from user U's user record (the first time the FOR loop is executed, the user U will be the user A). The processing performed by the inner FOR loop is given at steps 10.24 to 10.26. Here, firstly at step 10.24 the identity (conveniently the user record number) of the present user record B which is being processed is placed in a list Y. Next, at step 10.25 the present user record B is compared against the search term X to see if it matches, either substantially or exactly, to the search term. If this is the case, the processing proceeds to step 10.26, wherein the corresponding entry in the list L to the user record B is moved to a sub-list M. The sub-list M has the same purpose as in the first embodiment, and each entry further includes the link-type of the link from the user record for user U (user A initially) to the user record B, as well as the present hop count as taken from the hop_count variable. At the present time in the example described here the hop count is 1, as the user records B are directly linked to the user record of user A.

It should be noted here that if a user record has already been processed, for example on an earlier operation of the inner FOR loop (see later for how the inner FOR loop can repeat) then preferably it is not processed again by the inner FOR loop. This can be accomplished by maintaining a list Q of user record numbers which have been processed by the inner FOR loop previously, and then comparing the present user record number to be processed by the inner FOR loop with the list Q prior to each iteration of the loop. These steps are not shown on the diagram, but are required to ensure that only records which have not been processed previously are searched by the search process.

If at step 10.25 the user record B does not match to the search term X processing proceeds to step 10.28, wherein an evaluation is made as to whether all the user records B directly linked to from have been processed by the inner FOR loop. If this is not the case at step 10.20 the next user record B is selected, and the inner FOR loop commences another iteration. In contrast, if all the user records B have been processed by the inner FOR loop, processing proceeds to step 10.32, wherein an evaluation is made as to whether all the user records in the list Z have been processed in accordance with the outer FOR loop. If this is not the case at step 10.34 the next user record A is selected, and the outer FOR loop commences another iteration. In contrast, if all the user records in list Z have been processed by the outer FOR loop, processing proceeds to step 10.36.

At step 10.36 an evaluation is made to determine whether or not on any iteration of the inner FOR loop the step 10.26 acted to move any results from the results list L to the sub-list M. If this was the case then the sub-list M will contain a short-list of candidate results and hence no further processing would be required to determine further candidate results. In the present example description where the outer FOR loop has performed its iterations for the list Z with only one member i.e. the original user A, any members of M would have a hop count of only one, in that they are directly linked to A.

If it is determined that the sub-list M has one or more members, then processing proceeds to the step 8.42 of FIG. 9, and from then on in accordance with FIG. 9 as previously described. In this respect, the reader is referred to the discussion of FIG. 9 given earlier in respect of the first embodiment.

On the contrary, if step 10.36 determines that the sub-list M is empty, then this means that none of the users B directly linked to from A matched the search term X. In this case it then becomes necessary to search deeper within the network of user records, to a hop count of two. That is, the user records which are linked to form the user records which are directly linked to the user A record will be examined.

This is achieved by proceeding to step 10.38. Here, an evaluation is made to determine whether the hop_count variable has reached a maximum value. This maximum value is pre-set in advance, and may take any integer value. The greater the value then the deeper into the network of user records the search is allowed to proceed, but it is thought that a maximum value of no more than six should suffice. This upper limit is based on the so-called "small world" theory mentioned earlier, which anecdotally provides that every person on Earth should have no more than six degrees of separation between them, in that any particular person should need no more than six social or family ties to encompass the entire population (e.g. a "friend of a friend of a relative of a friend of a relative of a friend" (in any friend/relative combination) could be anyone).

If the evaluation returns a positive in that the maximum hop count value has been reached, then processing proceeds to step 10.40, wherein a null result is returned. The procedure then ends. Alternatively, in a DQ system the caller may be put through to a human operator or IVR system, in a similar manner to step 8.54 of FIG. 9.

For the purposes of the presently described example, however, assume that the maximum hop-count value is 6, and hence as the present hop count is only 1, the evaluation returns a negative and processing proceeds to step 10.42, wherein the hop_count variable is incremented by 1 to 2, to reflect that on the next processing loop the user records being processed are located two hops away from user A's user record.

Following step 10.42, at step 10.44 the list Z is made to contain the contents of the list Y. From step 10.24 it will be recalled that whenever a user record B was processed in the inner FOR loop its identity was also placed in the list Y, and that was for use at this point at step 10.44. Thus, in the present example the list Z is made to contain the user record identities (conveniently the user record numbers) of the each user record in the list Y, namely each user record which was linked to from the user A record.

Next, having updated the list Z to match the list Y, the list Y is cleared. This is to allow totally new entries to be placed into list Y during the next operation of the inner and outer FOR loops.

At this point, therefore, all the user records directly linked to the original user A record have been searched and no matches found. It is therefore necessary to proceed one hop deeper into the network of user records and search all those user records which are located two hops onwards from the user A record. This is achieved by commencing the outer FOR loop again at step 10.20, to process every user record U in the list Z. Now, on the second pass, there should be more than one user U in the list Z, as every user record linked to from the original user A should listed in the list Z. As before, processing proceeds according to the inner FOR loop of steps 10.22 to 10.30, and the additional steps of 10.32 and 10.34 of the outer FOR loop for every record in the list Z. Then, the evaluation of step 10.36 is performed again, and if still there are no candidates in the sub-list M the hop-count is incremented, and the procedure repeated once again. It will be understood that the procedure may be repeated as many times as necessary until the maximum hop count parameter is reached.

Thus, the second embodiment acts to progressively search along the links from the user A record deeper and deeper into the network of user records until either one or more matches to the search term X are found, or until the maximum hop count parameter is reached. The search has the advantage of being exhaustive, as at every hop depth in the network every user record linked to is searched. Thus, every user record at hop depth 1 is examined first, and if no matches are found every user record at hop depth 2 is then examined. If still no match is found the search proceeds to hop depth 3, and those user records at 3 hops from the user A record are examined. If still no match is found the hop depth is incremented once again, and so on until either a match is found, or the maximum hop depth reached.

In either of the first or second embodiments of the search algorithm as described above, once a successful search has been carried out then preferably a link is formed in user A's user record to the user record of the person who was searched for. This link is of type "search_1", to indicate that the link was from the user who requested the search, to the user who was searched for. Preferably, a reciprocating link of type "search_2" to the user who requested the search is placed in the user record of the user who was searched for. In future searches these links may be used to facilitate additional searching.

In some embodiments, the name and number of the person who was searched for may be placed into the address book of user A's record. Thus, if user A ever needs to search for the searched-for person ever again, the search algorithm would find the number in the address book, without having to follow the links, hence improving computational efficiency of the search.

Having described the link creation and search algorithms of the first and second embodiments, example user records and links will now be described with reference to FIGS. 11 and 12.

Figure 11:
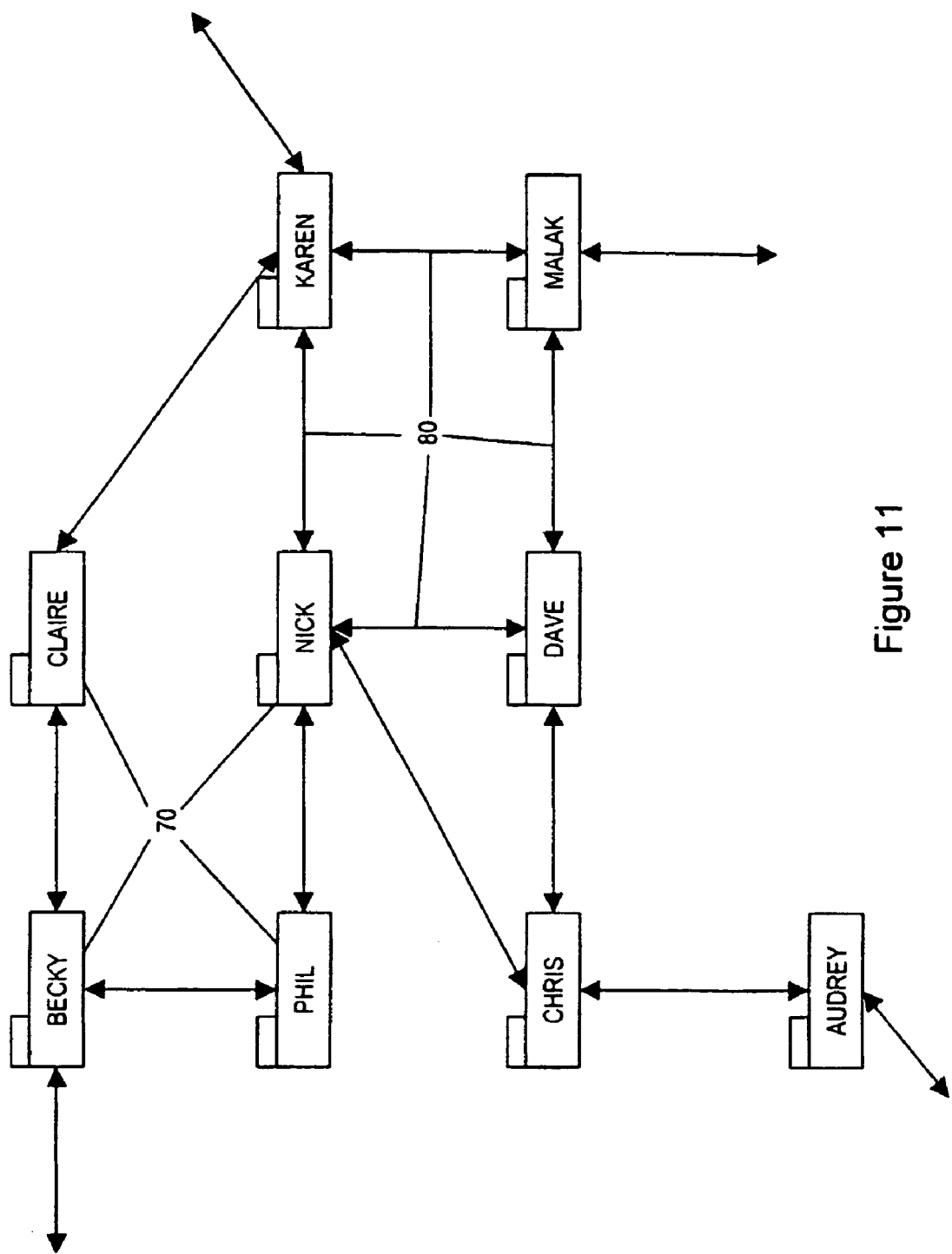
Figure 12:
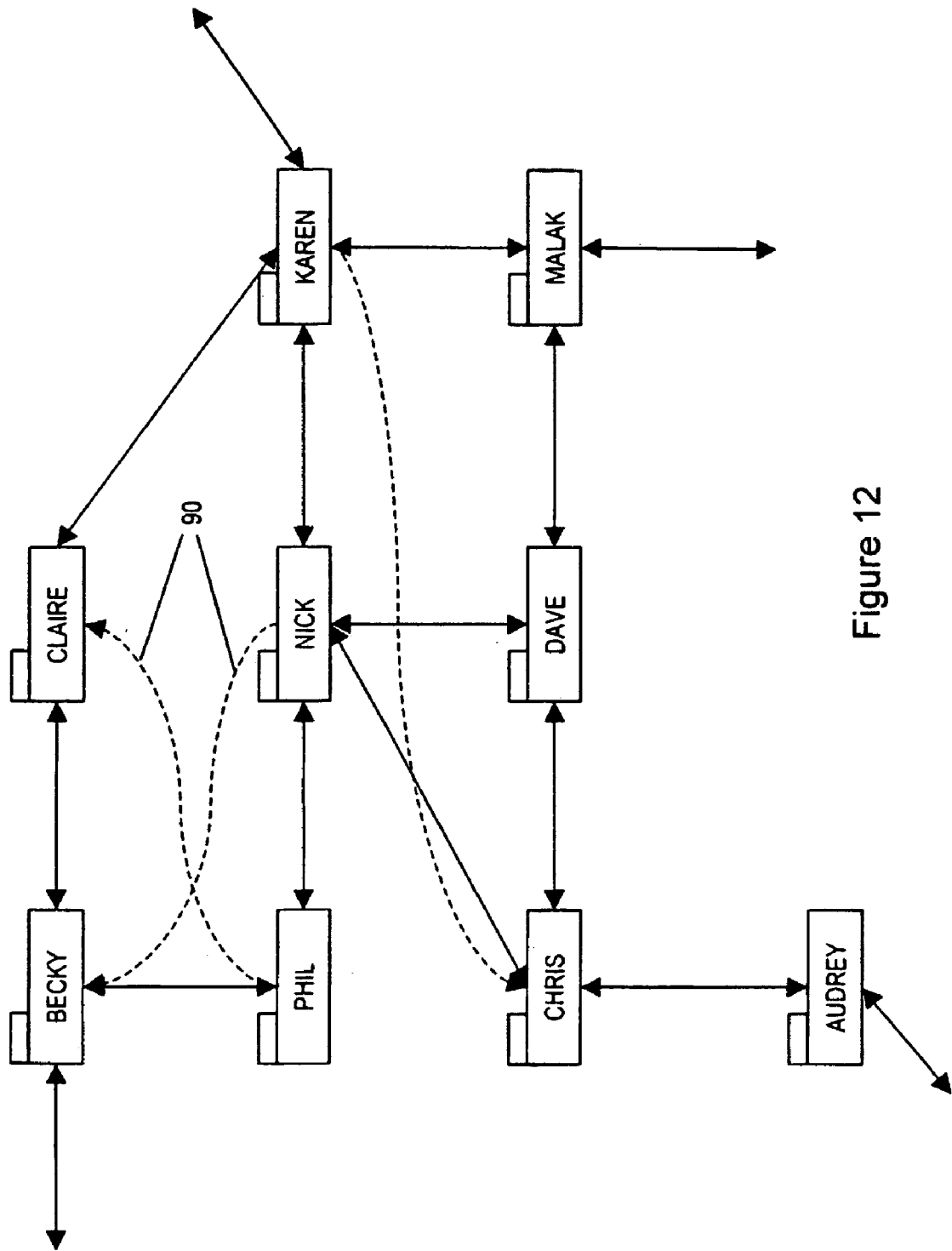
FIG. 12 is identical to FIG. 11, but further illustrates the formation of links between user records in the embodiments of the present invention.

More particularly, FIG. 11 shows a plurality of user records 70, which have been processed according to the processing performed by the link creation program of the embodiments, such that links 80 between the user records are stored in the user records. In particular, in the example shown in FIG. 11 nine user records are shown for the users Becky, Claire, Phil, Nick, Karen, Chris, Dave, Malak, and Audrey. In this example, Becky's user record has links to Claire's user record and Phil's user record, plus other user records not shown. Claire's user record has links to Becky's user record and Karen's user record whereas Phil's user record has links to Becky's user record and Nick's user record. Nick's user record contains link fields to link to Phil's user record, Karen's user record, Chris's user record, and Dave's user record. Moreover, Karen's user record contains link fields to Claire's user record, Nick's user record, Malak's user record and other user records not shown.

Chris's user record is linked to Nick's user record and Dave's user record, as well as Audrey's user record. Furthermore, Dave's user record contains links to Chris's user record, Nick's user record and Malak's user record. Malak's user record contains links to Karen's user record and Dave's user record, as well as other user records not shown. Finally, Audrey's user record is linked to Chris's user record, in addition to other user records which are not shown.

Figure 5:
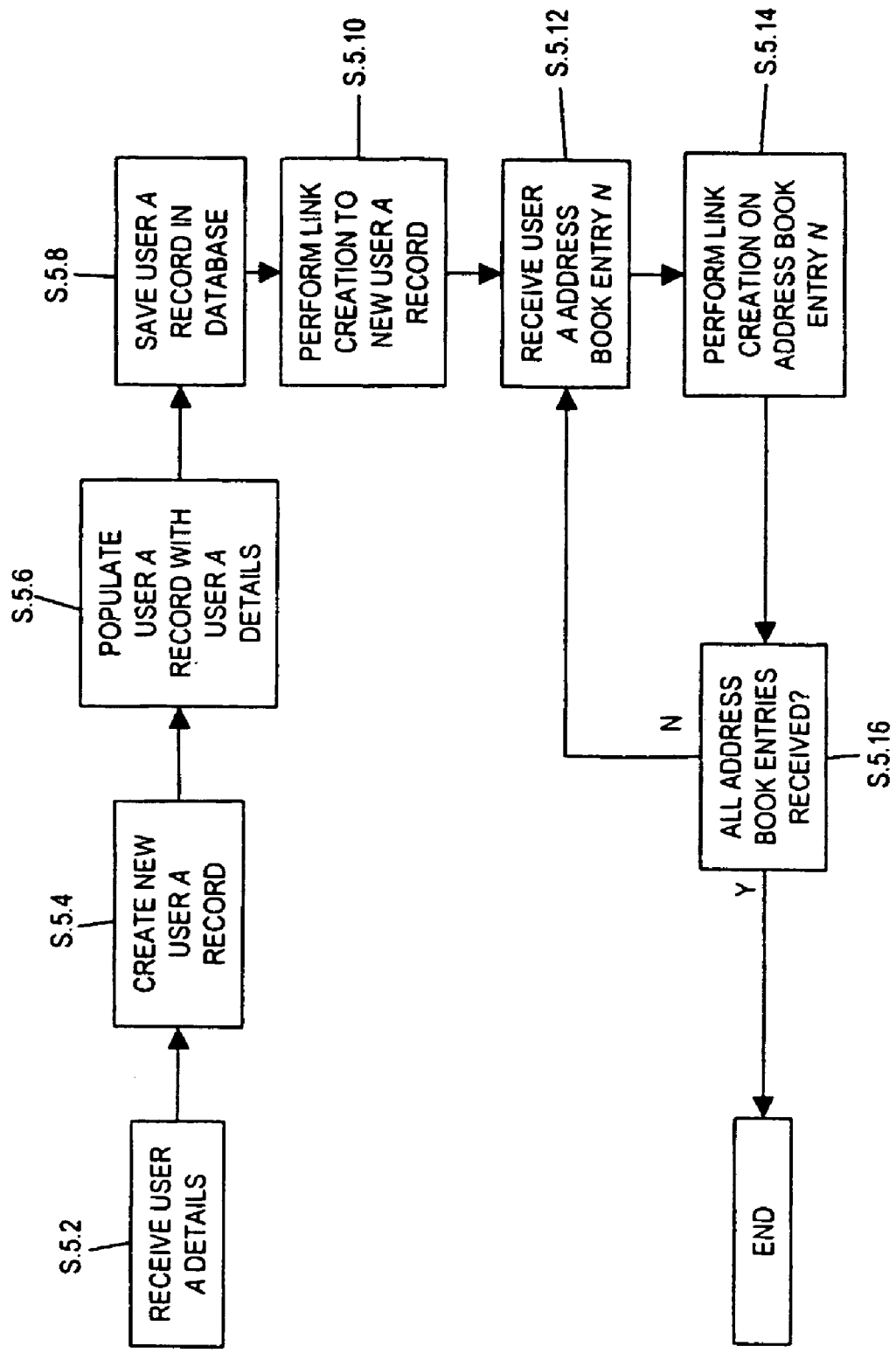
FIG. 5 is a flow diagram illustrating the procedure performed by the embodiments of the invention on registration of a new user.
Figure 6:
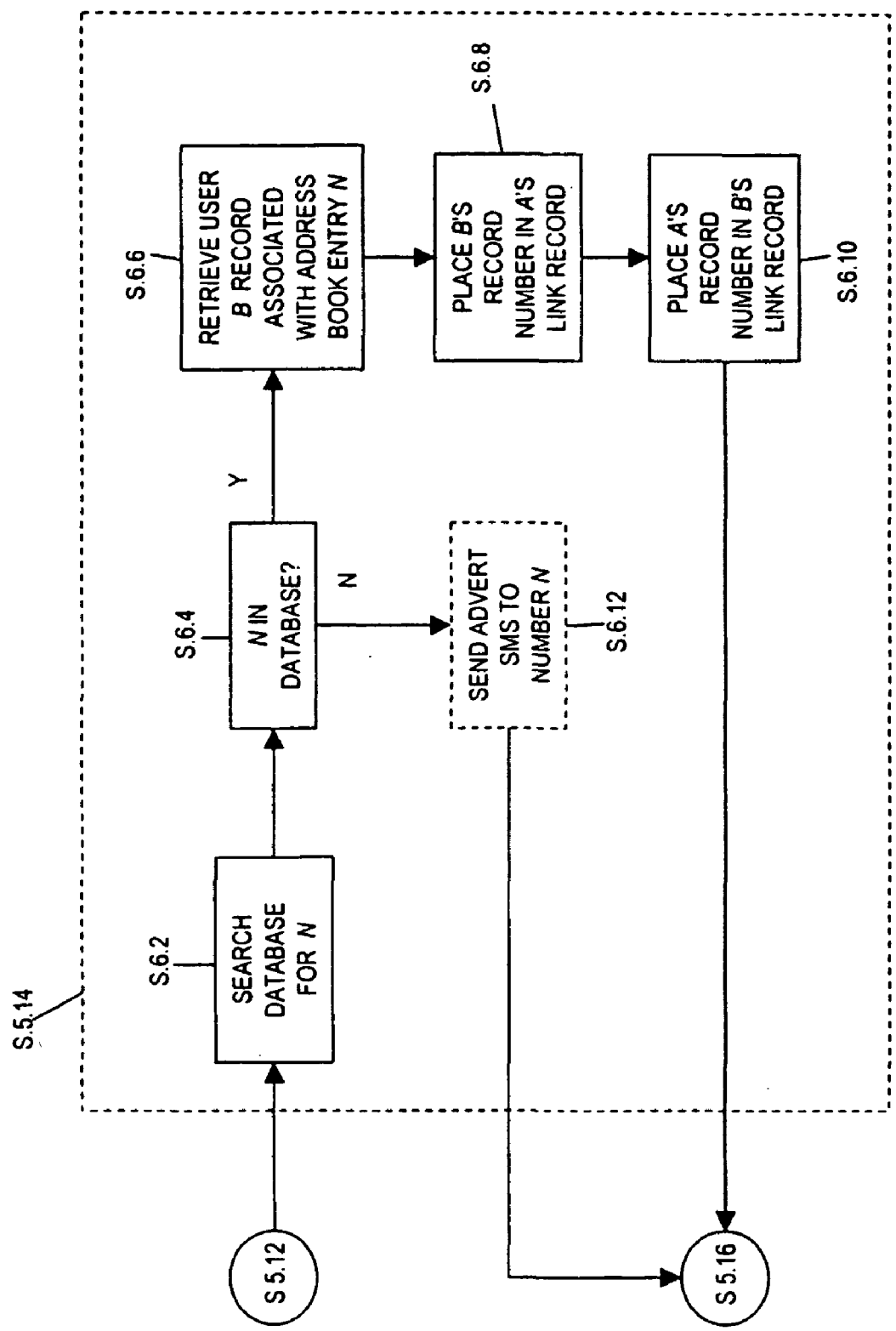
FIG. 6 is a flow diagram illustrating the link creation process for new address book entries.

The above described links would have been created by the link creation program 18 during the process controlled by the user registration program 16 and shown in FIG. 5. Each link in this case is reciprocal, as will have been apparent from the description given above.

With such user records and associated links, examples of how searching could be performed and search links established will now be described with respect to FIG. 12.

As a first example, imagine that Phil wishes to search for the number of Claire. In this case, Claire is not in Phil's address book, else there would have been a link between Phil and Claire. Therefore, the searching algorithm of the first or second embodiments will fail to find Claire in Phil's address book, and hence a search of all the registered user records will be performed. In this case Claire's record may be returned, in addition to other records of similar matches not shown. In such a case, according to either search algorithm the user records linked to from Phil's user records will be searched, which in this case are Becky's user record and Nick's user record. In this case, as neither Becky nor Nick would match to the search term provided for Claire, the algorithm then looks at the user records linked to from Nick's and Becky's user records. In this case, Claire is not linked from Nick's user record, and hence the link from Phil to Nick proves to be of no help. However, there is a Claire linked to from Becky's user record, and Becky's user record is linked to Phil's user record. Therefore, the number of Claire who is linked to Becky's user record will be returned to Phil as the result of his search, due to this link from Becky to Claire, and from Phil to Becky. Having had Claire's result returned, a link is formed in Phil's user record to Claire's user record for future search use.

As a second example, imagine that Nick wishes to search for Becky's number. As Becky is not in Nick's user record address book then the links of those user records which are linked to Nick's user record will be searched. In this case, Becky is linked from Phil's user record and hence Becky's number will be returned to Nick as the search result. A link is then established in Nick's user record to Becky's user record for future use.

A third example is also shown, where Karen wishes to search for Chris's telephone number. Here, Chris's user record is linked to Nick's user record, which is linked to Karen's user record, and hence Chris's number will be returned to Karen in the same manner as previously described for the first and second examples above. A link is then established in Karen's user record to Chris's user record for future searching purposes.

Imagine now that Karen wishes to search for Audrey's number, using the search process of the first embodiment. Previously, although the search algorithm may have returned Audrey's number as a list of possible results, it would not have ranked Audrey's number as the most probable result. However, because Karen now has a link to Chris's user record by virtue of her previous search therefor, and due to the fact that Audrey is linked to from Chris's user record as evidenced by the existing link therebetween, the search algorithm will return Audrey's number to Karen by virtue of her previously established search link to Chris's user record. Thus, it should be apparent that as the network develops, and more and more user records are added, and searches performed, then the links stored in any particular user's record will increase in number, such that eventually the user records will form a largely interconnected network of records. Such an evolution of a network of records should improve the performance of the directory enquiry service over time.

Now consider a fourth example, which illustrates the second embodiment only. Here, suppose that Audrey wishes to search for Becky. As Becky is not directly linked to Audrey the search algorithm of the second embodiment will then search all the user records one hop away, in this case Chris's user record. As Chris' user record does not match to the search term the hop depth will be increased to two, and those user records two hops away from Audrey's user record will be examined. In this case, this will be the user records of Nick, Dave, and (assuming the link established by the search performed by Karen for Chris is two-way) Karen. As none of these user records match the search criteria of Becky, the hop depth is increased to three, and those user records linked to from Nick, Dave, and Karen's user record will be examined. In this case these are Chris's record (which has already been examined, and hence should preferably not be examined again), Malak's record, Claire's record, and Phil's record. As none of these would match to the search term, the hop depth is increased once again, and those linked records examined. In this case, the linked records are Becky's and Nick's (from Phil's record), Becky's and Karen's (from Claire's record), and Dave's and Karen's (from Malak's record). In this case, as all of Nick's, Karen's, and Dave's records have been processed before they would preferably not be processed again. Thus this leaves only Becky's record, which has two entries. As Becky's record would match to the search term then both entries are moved into the sub-list M, and applying any of the ranking algorithms results in the same result that Becky's user record is returned.

The establishment of user records linked according to links determined from existing personal directory data as provided by the present invention therefore provides for powerful and efficient searching algorithms to be devised which make use of such data, as also provided by the present invention. By such provision, improved searching of directory information is obtained.

Moreover, although we have described the embodiments above in terms of a directory enquiries system for telephone numbers, it should be understood that in fact the invention can find application in any directory system, and in particular for other types of user addresses such as email addresses, network addresses, and the like.

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

The invention claimed is:

1. A computer-implemented method for processing and searching user records for user addresses in response to a request therefor, the method comprising:
 a) receiving user record information from a plurality of users, each set of user record information including at least a user record user identifier and a user record user address, and at least a subset of the received sets of user record information each further including a list of one or more list user identifiers and list user addresses;
 b) storing, in a computer storage device, the received sets of user record information as a plurality of user records;
 c) processing, using a computer processing unit, the user records to determine, for each list user address stored in the list of each user record, whether the list user address is the same as any of the user record user addresses of any other user records and storing link information in each user record linking the particular user record to those other user records whose user record user address is the same as a list user address stored in the list of the particular user record, and further processing the user records to determine, for each user record, whether the user record user address thereof is the same as any of the list user addresses from the other user records and further storing link information in each user record linking the particular user record to those other of the user records which include a list user address which is the same as the particular user record's user record user address;
 d) receiving a search request from a user specifying a user identifier for which the corresponding user address is required;
 e) identifying the user record of the user making the search request; and
 f) searching the stored user records using the link information to produce a list of search results corresponding to the search request, wherein the link information is iteratively used to identify further user records located up to a predetermined number of links from the user record of the user making the search request.

2. The method according to claim 1, wherein at least one or more of the user addresses are telephone numbers.

3. The method according to claim 2, wherein at least some of the telephone numbers are mobile telephone numbers.

4. The method according to claim 1, wherein at least one or more of the user identifiers are the names of registered users.

5. A system for processing and searching user records for user addresses in response to a request therefor, comprising:
 a) means for receiving user record information from a plurality of users, each set of user record information including at least a user record user identifier and a user record user address, and at least a subset of the received sets of user record information each further including a list of one or more list user identifiers and list user addresses;
 b) record storage means for storing the received sets of user record information as a plurality of user records;

c) record processing means for processing the user records to determine, for each list user address stored in the list of each user record, whether the list user address is the same as any of the user record user addresses of any other user records and storing link information in each user record linking the particular user record to those other user records whose user record user address is the same as a list user address stored in the list of the particular user record, the record processing means being further operable to process the user records to determine, for each user record, whether the user address thereof is the same as any of the list user addresses from the other user records and to store link information in each user record linking the particular user record to those other of the user records which include a list user address which is the same as the particular user record's user address;

d) means for receiving a search request from a user specifying a user identifier for which the corresponding user address is required;

e) means for identifying the user record of the user making the search request; and f) search means for searching the stored user records using the link information to produce a list of search results corresponding to the search request, wherein the link information is iteratively used to identify further user records located up to a predetermined number of links from the user record of the user making the search request.

6. The system according to claim 5, wherein at least one or more of the user addresses are telephone numbers.

7. The system according to claim 6, wherein at least some of the telephone numbers are mobile telephone numbers.

8. The system according to claim 5, wherein at least one or more of the user identifiers are the names of registered users.

* * * * *